(12) United States Patent
Tabassi et al.

(10) Patent No.: US 9,227,351 B2
(45) Date of Patent: Jan. 5, 2016

(54) EDGE-GATED INJECTION MOLDING APPARATUS

(71) Applicant: Mold-Masters (2007) Limited, Georgetown (CA)

(72) Inventors: Payman Tabassi, Rockwood (CA); Kenneth Jacob, Tunkhannock, PA (US)

(73) Assignee: Mold-Masters (2007) Limited, Georgetown, ON (CA)

( * ) Notice: Subject to any disclaimer, the term of this patent is extended or adjusted under 35 U.S.C. 154(b) by 0 days.

(21) Appl. No.: 14/424,697

(22) PCT Filed: Aug. 28, 2013

(86) PCT No.: PCT/CA2013/000745
§ 371 (c)(1),
(2) Date: Feb. 27, 2015

(87) PCT Pub. No.: WO2014/032165
PCT Pub. Date: Mar. 6, 2014

(65) Prior Publication Data
US 2015/0202811 A1 Jul. 23, 2015

Related U.S. Application Data

(60) Provisional application No. 61/693,876, filed on Aug. 28, 2012.

(51) Int. Cl.
*B29C 45/22* (2006.01)
*B29C 45/27* (2006.01)

(52) U.S. Cl.
CPC ......... *B29C 45/2735* (2013.01); *B29C 45/2708* (2013.01)

(58) Field of Classification Search
CPC .................................................. B29C 45/2735

USPC .......................................................... 425/572
See application file for complete search history.

(56) References Cited

U.S. PATENT DOCUMENTS 3,752,615 A  8/1973  Van Manen
5,009,587 A  4/1991  Corvaglia et al.
(Continued)

FOREIGN PATENT DOCUMENTS

DE  29902185  4/1999
EP  1142686  10/2001
(Continued)

OTHER PUBLICATIONS

Heitec, 3-D Hot Runner System, www.heitec.com, May 5, 2010.
(Continued)

*Primary Examiner* — Tim Heitbrink
(74) *Attorney, Agent, or Firm* — Medler Ferro PLLC

(57) ABSTRACT

Disclosed is an edge gating injection molding apparatus for delivering a moldable material to an array of mold cavities, the array can have a first column and a last column of mold cavities, the edge gating injection molding apparatus comprising: a unidirectional delivery body for delivering a first stream of the moldable material to a different one of each mold cavity of the first column and the last column of mold cavities, via a first location of the different one of each mold cavity of the first column and the last column of mold cavities; and a bidirectional delivery body for delivering a second stream of the moldable material to the different one of each mold cavity of the first column and the last column of mold cavities, via a second location of the different one of each mold cavity of the first column and the last column of mold cavities.

20 Claims, 23 Drawing Sheets

(56) References Cited

U.S. PATENT DOCUMENTS

| | | |
|---|---|---|
| 5,326,251 A | 7/1994 | Gellert |
| 5,620,723 A | 4/1997 | Glaesener et al. |
| 5,820,899 A | 10/1998 | Gellert et al. |
| 5,885,628 A | 3/1999 | Swenson et al. |
| 7,179,081 B2 | 2/2007 | Sicilia et al. |
| 7,214,053 B2 | 5/2007 | Schottli et al. |
| 7,303,384 B2 | 12/2007 | Schreck |
| 7,794,228 B2 | 9/2010 | Catoen |
| 7,803,306 B2 * | 9/2010 | Babin ............... B29C 45/2735 425/572 |
| 7,850,442 B2 | 12/2010 | Fairy et al. |
| 7,998,390 B2 | 8/2011 | Olaru et al. |
| 8,475,158 B2 | 7/2013 | Fairy |
| 8,821,151 B2 * | 9/2014 | Overfield ............ B29C 45/2735 425/572 |
| 8,899,964 B2 | 12/2014 | Babin et al. |
| 8,932,046 B2 | 1/2015 | Tabassi et al. |
| 2011/0311676 A1 | 12/2011 | Fairy |

FOREIGN PATENT DOCUMENTS

| | | |
|---|---|---|
| EP | 2314438 | 4/2011 |
| WO | 02/36324 | 5/2002 |

OTHER PUBLICATIONS

"Spacecraft or What?", http://www.technoject.com/company-news, Nov. 22, 2007.

* cited by examiner

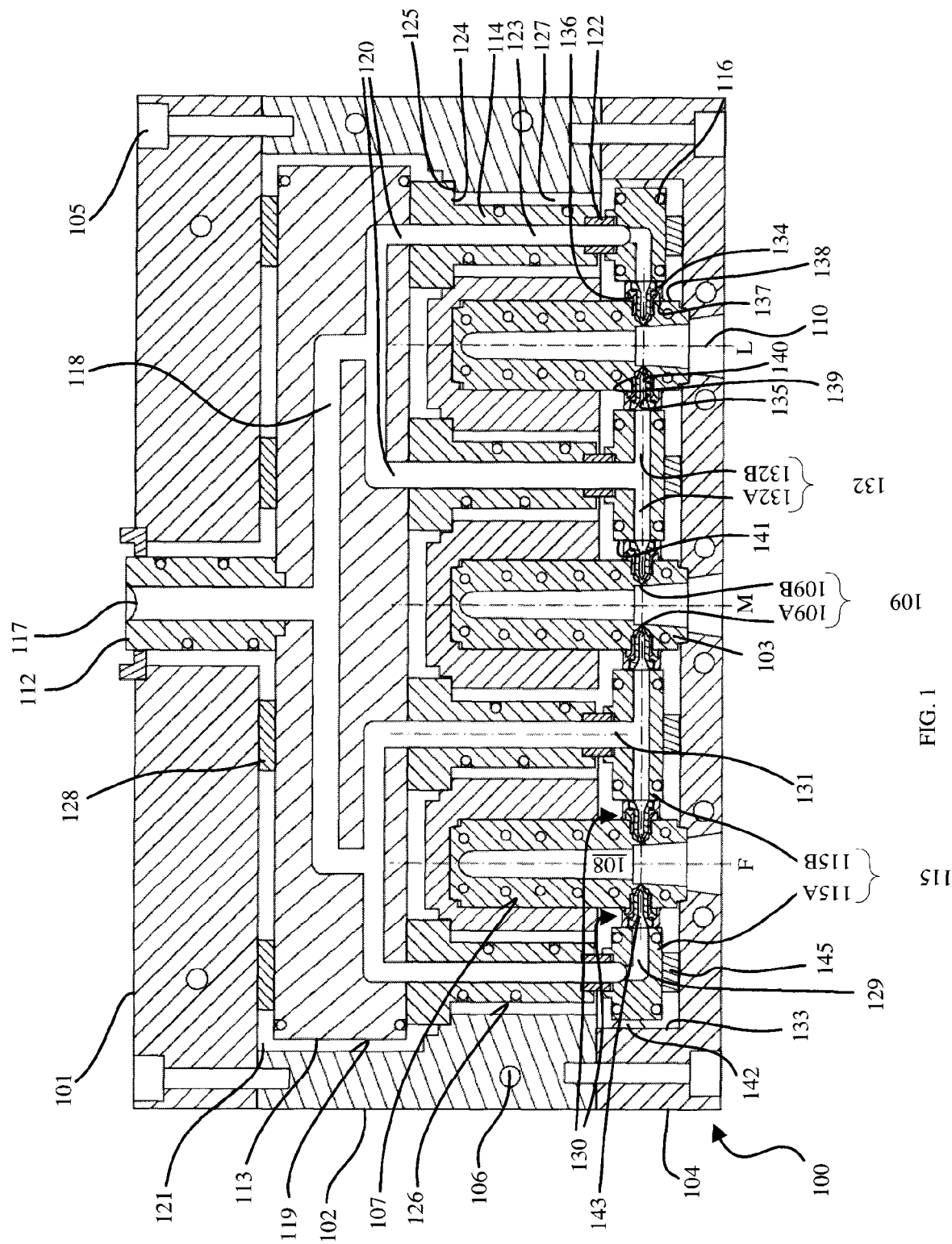

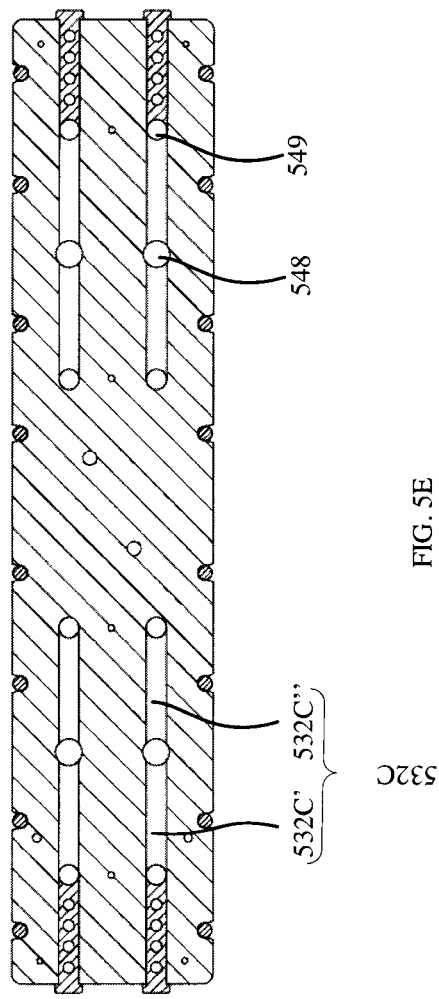

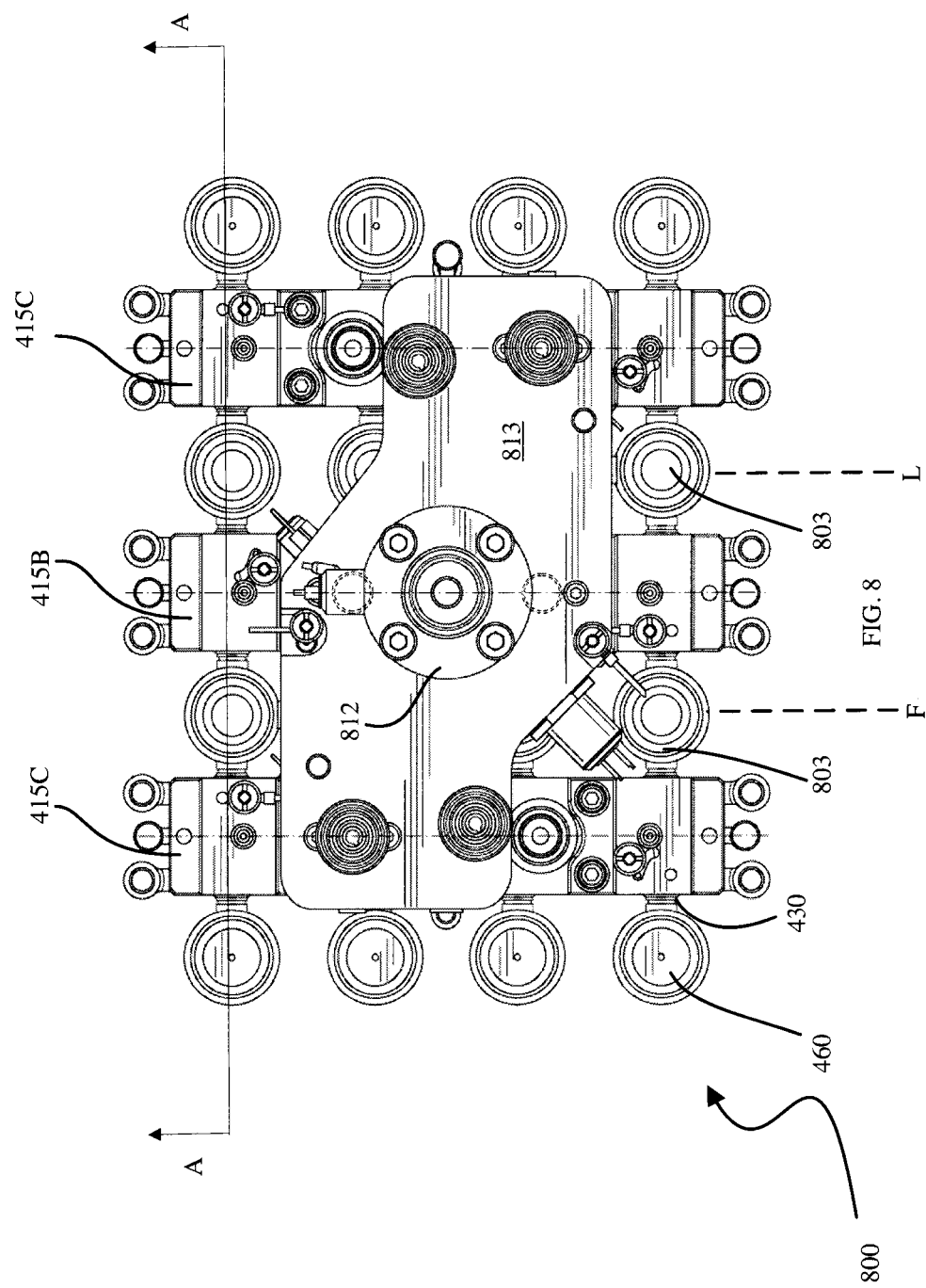

EDGE-GATED INJECTION MOLDING APPARATUS

CROSS-REFERENCE TO RELATED APPLICATIONS

This application is a national phase entry of PCT/CA2013/000745 filed Aug. 28, 2013, which claims the benefit of U.S. Appl. No. 61/693,876 filed Aug. 28, 2012, the disclosures of which are incorporated by reference herein in their entirety.

FIELD

The disclosure relates generally to an injection molding system and, in particular, to an edge-gated injection molding system.

BACKGROUND

Edge gating is commonly used in the manufacture of slender elongate molded articles such as pipettes or a syringe barrels. The cavity defining the molded article usually has only one gate through which molding material flows in a direction that is generally transverse to the longitudinal axis of the molded article. Pressure within the cavity from molding material flowing through the gate on only one side of the part can adversely affect part filling and/or part geometry. For example, when examining the fill rate of such parts, the side of the part on which the gate is located generally fills first, thus creating an angled flow front as the molding material advances away from the gate. Further, if injection pressure is high enough, the mold core, which defines the inside of the molded article, can be deflected away from the gate. This problem is exacerbated in molded articles that are particularly long, or have a slender core that is not supported at its distal end. The result of such core deflection is molded articles having uneven wall thickness. In molding applications, such as pipette molding and syringe barrel molding, this uneven wall thickness may cause non-uniform part shrinkage which may result in volumetric discrepancies between molded parts as well as an overall increase in the number of defect parts which do not conform to the tolerance requirements of the end user.

One solution to avoiding the aforementioned difficulties with edge gating is to reduce injection pressure and/or increase part fill time; however, this comes at a cost of reduced productivity. Another solution is to inject molding material into each cavity via two mold gates, one on each side of the molded article. Both German patent DE 29902185U and U.S. Pat. No. 7,214,053 disclose edge gating application in which groups of four mold cavities are fed molding material from two sides by groups of four nozzles. The mold cavities are evenly spaced around a first pitch circle and the nozzles are evenly spaced around a second larger pitch circle with the spacing of the nozzles offset by 45 degrees relative to the orientation of the mold cavities. In the resulting arrangement each mold cavity receives molding material from two injection nozzles and each injection nozzle delivers molding material to two mold cavities. While the problem of core shift is reduced in this configuration, the cavitation density of the mold suffers as a result of unused space at the center or the pitch circle. Furthermore, should the cavity/nozzle groupings be increased to, for example, groupings of eight cavities and eight injection nozzles spaced about pitch circles that are used in the above described configuration the cavitation density of the mold is adversely affected as the unused space at the center of each pitch circle increases greatly with an increase in pitch circle diameter.

As such, a need exists in the art for an edge gating apparatus that reduces the above described problems while effectively using the available space inside the mold.

BRIEF SUMMARY

An aspect of the embodiments hereof are directed toward an edge gating injection molding apparatus for delivering a moldable material to an array of mold cavities, the array can have a first column and a last column of mold cavities, the edge gating injection molding apparatus comprising: a unidirectional delivery body for delivering a first stream of the moldable material to a different one of each mold cavity of the first column and the last column of mold cavities, via a first location of the different one of each mold cavity of the first column and the last column of mold cavities; and a bidirectional delivery body for delivering a second stream of the moldable material to the different one of each mold cavity of the first column and the last column of mold cavities, via a second location of the different one of each mold cavity of the first column and the last column of mold cavities.

Another aspect of the embodiments hereof are directed toward an injection molding apparatus comprising: a plurality of cavity inserts arranged in an array having n columns of cavities, each cavity insert can have a pair of opposing mold gates; a unidirectional delivery body in fluid communication with a molding material source, and positioned outside of a first column of the array; another unidirectional delivery body in fluid communication with the molding material source, and positioned outside of the last column of the array; and n−1 bidirectional delivery bodies in fluid communication with the molding material source, each of the n−1 bidirectional delivery bodies positioned between adjacent columns of the array, wherein each cavity can receive molding material from at least one bidirectional delivery body.

BRIEF DESCRIPTION OF THE DRAWINGS

The foregoing and other features and advantages of the disclosure will be apparent from the following description of the disclosure as illustrated in the accompanying drawings. The accompanying drawings, which are incorporated herein and form a part of the specification, further serve to explain the principles of the disclosure and to enable a person skilled in the pertinent art to make and use the disclosure. The drawings are not to scale.

FIG. 1 is a sectional view of a three cavity edge-gated injection molding apparatus in accordance with an embodiment of the present disclosure.

FIG. 5E is a sectional view of the bidirectional delivery body of FIG. 4 taken along line E-E.

FIG. 8 is a top view of an edge gated injection molding apparatus in accordance with another embodiment.

DETAILED DESCRIPTION OF EMBODIMENTS

Specific embodiments of the present disclosure are now described with reference to the figures. In the following description, "downstream" is used with reference to the general direction of mold material flow from an injection unit to a mold cavity of an injection molding system and also to the order of components, or features thereof through which the mold material flows, from an inlet of the injection molding system to a mold cavity, whereas "upstream" is used with reference to the opposite direction. Also, in the following description each of the terms "left", "right", "top" and "bottom" is used with reference to the non-limiting orientation of components as shown in the figures. While specific configurations and arrangements are discussed, it should be understood that this is done for illustrative purposes only. A person skilled in the relevant art will recognize that other configurations and arrangements can be used without departing from the scope of the present disclosure.

Figure 1A:
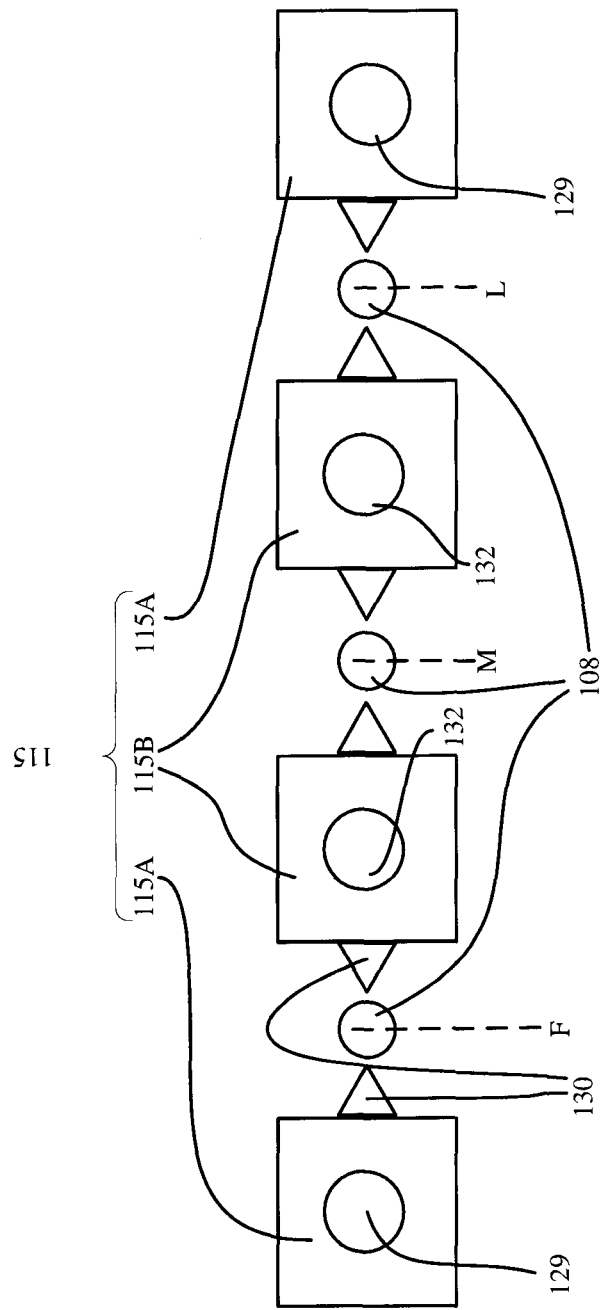
FIG. 1A is a schematic of the arrangement of components of FIG. 1.
Figure 2:
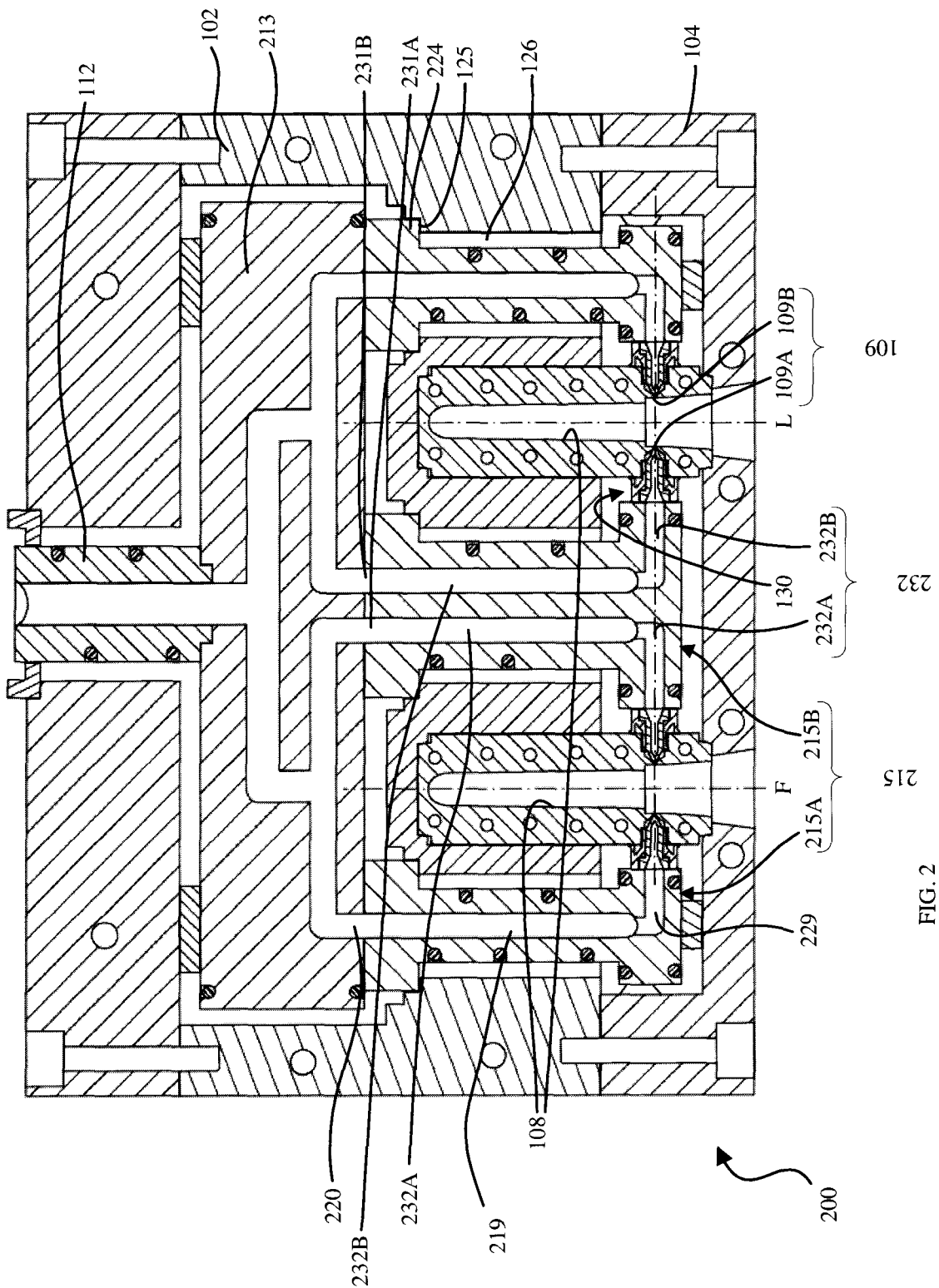
FIG. 2 is a sectional view of a two cavity edge-gated injection molding apparatus in accordance with another embodiment of the present disclosure.

FIG. 1 is a section view of a three cavity edge-gated injection molding apparatus in accordance with an embodiment hereof and is generally indicated by reference numeral 100, features and aspects of which can be used accordingly with the other embodiments. FIG. 1A is a schematic of the arrangement of components of FIG. 1. Edge gated injection molding apparatus includes a back plate 101, a mold plate 102, cavity inserts 103, and a cover plate 104 all held together by a plurality of socket head cap screws 105 or the like. Back plate 101, mold plate 102, cover plate 104, and cavity insert 103 may be provided with fluid channels, such as fluid channel 106 called out on mold plate 102, through which a fluid is circulated to maintain injection molding apparatus 100 at a required processing temperature. Cavity insert 103 is located in a bore 107 in mold plate 102 and defines a cavity 108 which defines an outside surface of the article being molded. Cavity 108 together with a mold core (not shown) define the general shape of the article being molded by injection molding apparatus 100. To allow molding material to enter into cavity 108, each cavity insert 103 is provided with a pair of gates 109, (gate 109A refers to the gate to the left of cavity 108 as viewed on page, gate 109B refers to the gate to the right of cavity 108 as viewed on page, gates 109A, 109B are generically referenced as gate 109). In the current embodiment, gate 109A is at a first location and gate 109B is at a second location, the first and second locations are substantially diametrically opposite one another relative to an axial center line 110 of cavity 108. In another embodiment (not shown), gates 109A, 109B may be offset relative to each other and/or center line 110 of cavity 108. Edge gated injection molding apparatus 100 further includes an inlet 112, a manifold 113, a plurality of transfer bodies 114, and a plurality of delivery bodies 115 in the form of unidirectional delivery bodies 115A and bidirectional delivery bodies 115B. (Unidirectional delivery body/bodies 115A and bidirectional delivery body/bodies 115 are referred to generically as delivery body/bodies 115.) In the current embodiment, each of inlet 112, manifold 113, transfer bodies 114, and delivery bodies 115 is provided with a heater, such as heater 116 shown on delivery body 115, in the form of an embedded resistance heater for maintaining each of inlet 112, manifold 113, transfer bodies 114, and delivery bodies 115 at a required processing temperature. (The number and type of heaters are shown by way of example and not limitation.) In an alternative embodiment (not shown) only some of inlet 112, manifold 113, transfer bodies 114, and delivery bodies 115 are provided with a heater. Inlet 112, manifold 113, transfer bodies 114, and delivery bodies 115 can be referred to generally as a hot runner system. A molding machine nozzle (not shown) interfaces with inlet 112 at seat 117 to deliver a stream of moldable material under pressure to a manifold channel 118 of the manifold 113. Manifold 113 is located in a pocket 119 in mold plate 102, and serves to deliver the molding material stream from the molding machine nozzle (not shown) to each of the plurality of transfer bodies 114 via a respective manifold outlet 120. Pocket 119 is sized in order to maintain an insulating air space 121 around manifold 113. In the embodiment shown in FIG. 1, manifold 113 delivers the molding material stream from inlet 112 to four transfer bodies 114. Each transfer body 114 is configured for alignment between a transfer channel 123 and a respective manifold outlet 120 to receive a molding material stream from manifold channel 118. Transfer body 114 has a flange 124 that sits in a corresponding shoulder 125 of a clearance bore 126 in mold plate 102. Similar to pocket 119 described above, clearance bore 126 creates an insulating air space 127 between transfer body 114 and mold plate 102. A support disk 128 is positioned between manifold 113 and back plate 101 to focus the force from manifold heat expansion directly over each transfer body 114. During operation, the flange 124 and mold plate shoulder 125 arrangement, together with support disk 128 supports the load from heat expansion of manifold 113 while still allowing the load from manifold 113 to be used as a sealing means/force between transfer bodies 114 and manifold 113. Each transfer body 114 delivers the molding material from a respective manifold outlet 120 to a respective delivery body 115. As mentioned above, transfer body 114 is held in place against mold plate 102 at shoulder 125; as such, thermal expansion of transfer body 114 occurs in the direction of deliver body 115. A telescopic connector 122 is provided between each transfer body 114 and a respective delivery body 115 to slidably connect a transfer body 114 to a respective delivery body 115 and to absorb the forward heat expansion growth of transfer body 114 while also allowing fluid communication between transfer body 114 and a respective delivery body 115. The specific location of telescopic connector 122 is exemplary and is not intended to limit the scope of the present disclosure. In an alternative embodiment (not shown) transfer body 114 is fixedly connected to delivery body 115 and a telescopic connector is provided between transfer body 114 and manifold 113. In another embodiment, (also not shown) delivery body, transfer body, and manifold are all fixedly connected and a telescopic connector is provided between manifold and inlet as depicted in U.S. Pat. No. 5,494,433, which is incorporated in its entirety by reference. In yet another embodiment (as shown in FIG. 2), delivery body, transfer body, manifold, and inlet are all fixedly connected, and sealing between the aforesaid components is created by calculating the thermal expansion of each component to create the desired sealing load.

As discussed above, transfer body 114 delivers the molding material from a respective manifold outlet 120 to a delivery body 115. For discussion purposes, in the current embodiment cavities 108 of edge-gated injection molding apparatus 100 are arranged in a three by one array, that is, an array having three columns and one row, with cavity 108 on the left (as viewed on page) being in the first column F and cavity 108 on the right (as viewed on page) being in the third or last column L, and cavity 108 located in between the first column F and the last column L being the second or middle column M (see FIG. 1A). In an alternative non-limiting embodiment (not shown) injection molding apparatus 100 has a plurality of rows extending into, or out of the page view of FIG. 1 with each delivery body providing molding material to a plurality of mold cavities, similar to the embodiment discussed below having regard to FIG. 4. Returning to FIG. 1, the cavity in the first column F and the cavity in the middle column M are considered to be adjacent to each another, and the cavity in the last column L and the cavity in the middle column M are also considered to be adjacent to each other. Referring to cavity 108 in the first column F of the array, delivery body 115 is a unidirectional delivery body 115A that is positioned outside of the first column F of the array. Unidirectional delivery body 115A delivers molding material generally in one direction (i.e., towards mold cavity 108) and is provided with a uni-molding material channel or uni-channel 129 in fluid communication with transfer channel 123 via telescopic connector 122. A tip, or tip assembly 130 is coupled to unidirectional delivery body 115A at a downstream end uni-channel 129 for delivering a stream of molding material to cavity 108 in the first column F of the array via gate 109A. Referring to cavity 108 in the last column L of the array, the delivery body 115 is another unidirectional delivery body 115A that is positioned outside of the last column L of the array for delivering a stream of molding material to cavity 108 in the last column L of the array via gate 109B.

As discussed above, each cavity insert 103 is provided with two gates 109A, 109B. In order to deliver molding material to gate 109B of cavity 108 in the first column F of the array, and gate 109A of the cavity 108 in the last column L in the array, a bidirectional delivery body 115B, which delivers molding material in substantially opposite directions, is positioned between adjacent columns of the array. In the present embodiment, a bidirectional delivery body 115B is positioned between the first and middle cavities 108 of the array, and another bidirectional delivery body 115B is positioned between the middle and the third cavities 108 of the array. Bidirectional delivery body 115B has an inlet 131, in fluid communication with a respective transfer channel 123 via telescopic connector 122. Inlet 131 divides into two bi-molding material channels or bi-channels 132 which extend in generally opposite directions, specifically a first bi-channel 132A and a second bi-channel 132B which may be referred to collectively as bi-channel 132. At a downstream end of each bi-channel 132A, 132B a tip assembly 130 is coupled to each side of bidirectional delivery body 115B. One tip assembly 130 for delivering a stream of molding material to cavity 108 in one of the adjacent columns of the array, and the other tip assembly 130 for delivering a stream of the molding material to mold cavity 108 in the other of the adjacent columns of the array. Referring to bidirectional delivery body 115B positioned between cavity 108 in the first column F and cavity 108 in the middle column M, the tip assembly 130 coupled to the left side of bidirectional delivery body 115B delivers a stream of molding material to gate 109B on the right side of cavity 108 in the first column F whereas the tip assembly 130 coupled to the right side of bidirectional delivery body delivers a stream of molding material to gate 109A on the left side of cavity 108 in the middle column M. Referring to bidirectional delivery body 115B positioned between cavity 108 in the middle column M and cavity 108 in the last column L, the tip assembly 130 coupled to the left side of bidirectional delivery body 115B delivers a stream of molding material to gate 109B on the right side of cavity 108 in the middle column M whereas the tip assembly 130 coupled to the right side of bidirectional delivery body delivers a stream of molding material to gate 109A on the left side of cavity 108 in the last column L. In such an arrangement each cavity 108 of the array receives a stream of molding material from two delivery bodies 115; one stream from a bidirectional delivery body 115B and the other stream from either a bidirectional delivery body 115B (as is the case for cavity 108 in the middle column M of the array) or from a unidirectional delivery body 115A (as is the case for cavity 108 in the first F and last L columns of the array). That is, the delivery bodies 115 are positioned such that the pressure from the melt entering cavity 108 via gate 109A substantially balances the pressure from the melt entering cavity 108 via gate 109B.

Given the arrangement of cavities 108 and delivery bodies 115, the number of columns in the array can include n columns by m rows, where n is an integer greater than 1, such that a respective unidirectional delivery body 115A is positioned outside each of the first F and last L columns of the array and a respective one of n−1 bidirectional delivery bodies 115B is positioned between adjacent columns of the array. Accordingly, each array has one first column F, one last column L, and 0 or more middle columns M. In the current embodiment, cavities 108 in the first F, last L and middle M column F of the same row, and respective tip assemblies associated therewith are considered to be in-line with one another. Such an arrangement of cavities 108 and delivery bodies 115 allows for close pitch spacing and higher cavitational density, which in turn increases the number of molded articles produced during each injection cycle.

In the current embodiment tip assembly includes a tip body 134 that is slidably received in a bore 135 in a gate seal 136 such that the two pieces are substantially coaxial. An example of tip assembly 130 is disclosed in U.S. patent application 61/612,149 which is incorporated herein by reference. In embodiments hereof, tip body 134 may be formed from a thermally conductive material, such as beryllium copper, and gate seal 136 may be formed from a less thermally conductive material, such H13 steel. (Beryllium copper and H13 steel are provided by way of example and not limitation) A downstream end of gate seal 136 includes a face seal surface 137 that contacts and seals against a first sealing surface 138 of cavity insert 108. Gate seal 136 further includes a circumferential, seal surface 139 that contacts and seals against a corresponding second sealing surface 140 of cavity insert 108. Second sealing surface 140 is located within counter bore that surrounds each gate 109 of cavity insert 108. An upstream surface of tip body 134 and an upstream surface of its corresponding gate seal 136 are slidably disposed against a respective outside, or outlet surface 141 of delivery body 115 and are otherwise not directly attached or secured thereto. Such an arrangement maintains proper alignment between tip assembly 130 and gate 109 regardless of thermal expansion of the heated components of edge gated injection molding system 100.

In order to maintain a seal between tip assembly 130 and delivery body 115 thermal expansion of delivery body 115 applies pressure against tip body 134 and gate seal 136 to bear pressure between face seal surface 137 and first sealing surface 138 of cavity insert 103. If delivery body 115 is a bidirectional delivery body 115B thermal expansion of bidirectional delivery body 115B bears pressure upon both the face seal surface 137 associated with the tip assembly 130 on the left side of bidirectional delivery body 115B and the face seal surface 137 associated with the tip assembly 130 on the right side of bidirectional delivery body 115B such that bidirectional delivery body 115B is held in place between respective left and right tip assemblies 130 associated therewith. If delivery body 115 is a unidirectional delivery body 115A a backup pad 142, which may be similar to support disk 128 described above, is provided in a pocket 133 in cover plate between unidirectional delivery body 115A and cover plate 104. Similar to pocket 119 described above, pocket 133 creates an insulating air space around delivery bodies 115. Backup pad 142 creates a surface upon which unidirectional delivery body 115A applies force as a result of heat expansion of unidirectional delivery body in order to maintain a seal between unidirectional delivery body 115A and tip assembly 130. Back up pad 142 further serves to prevent unidirectional delivery body 115A from shifting away from cavity insert 103 as a result of injection pressure.

In order to locate delivery bodies 115 within injection molding apparatus 100, specifically, locating the height of a downstream end of uni-channel 129 and downstream end of bi-molding material channel 132 relative to a channel 143 of a respective tip assembly 130, a spacer 145 is provided in pocket 133 between each delivery body 115 and cover plate 104. Spacer 145 may also be used as a support to prevent downward movement (as viewed on page) of delivery body 115 as a result of injection pressure. In another embodiment (not shown) spacer 145 may also be used to laterally position (as viewed on page) delivery body 115 relative to a respective cavity insert 103 by, for example, engaging spacer 145 with a shoulder in each of cover plate 104 and delivery body 115. In a further embodiment (also not shown), spacer 145 locates the height of delivery body 115, whereas a dowel engages with delivery body 115 and cover plate 104 to maintain lateral positioning (as viewed on page) of delivery body 115 relative to a respective cavity insert 103.

While it may be desirable to inject even amounts of molding material through each gate 109A, 109B of cavity 108, a study undertaken by the applicant has shown that an even divide of molding material between the two gates leading to each cavity is not necessary for at least improving the core shift and flow length phenomenon described above with regard to single sided edge gating. The chart below outlines the effects of molding material distribution between two gates and core shift, and flow length difference.

| Flow Split (molding material distribution between gates) | Flow Length Difference at 86% fill (mm) | Max Core Shift at 86% fill (mm) | Max Core Shift at 100% fill (mm) |
| --- | --- | --- | --- |
| 0/100 | 7.1 | 0.58 | 0.5 |
| 40/60 | 1.3 | 0.126 | 0.148 |
| 50/50 | 0.1 | 0.001 | 0.0005 |

In the current embodiment manifold molding material channel 118 is sized such that manifold outlet 120, in fluid communication with a unidirectional delivery body 115A, has a cross-sectional area that is smaller than the cross sectional area of manifold outlet 120 in fluid communication with bidirectional delivery body 115B. This is done in order to encourage a greater flow of molding material to bidirectional delivery body 115B which supplies molding material to two tip assemblies 130. In the current embodiment the cross sectional area of manifold outlet 120 in fluid communication with a bidirectional delivery body 115B is substantially double the size of the cross sectional area of manifold outlet 120 in fluid communication with unidirectional delivery body 115A. In an alternative embodiment (not shown) manifold outlets 120 in fluid communication with unidirectional delivery body 115A and outlets 120 in fluid communication with bidirectional delivery body 115B are equally sized such that molding material flow to bidirectional delivery body 115B is equal to that of molding material flow to unidirectional delivery body 115A.

Figure 2A:
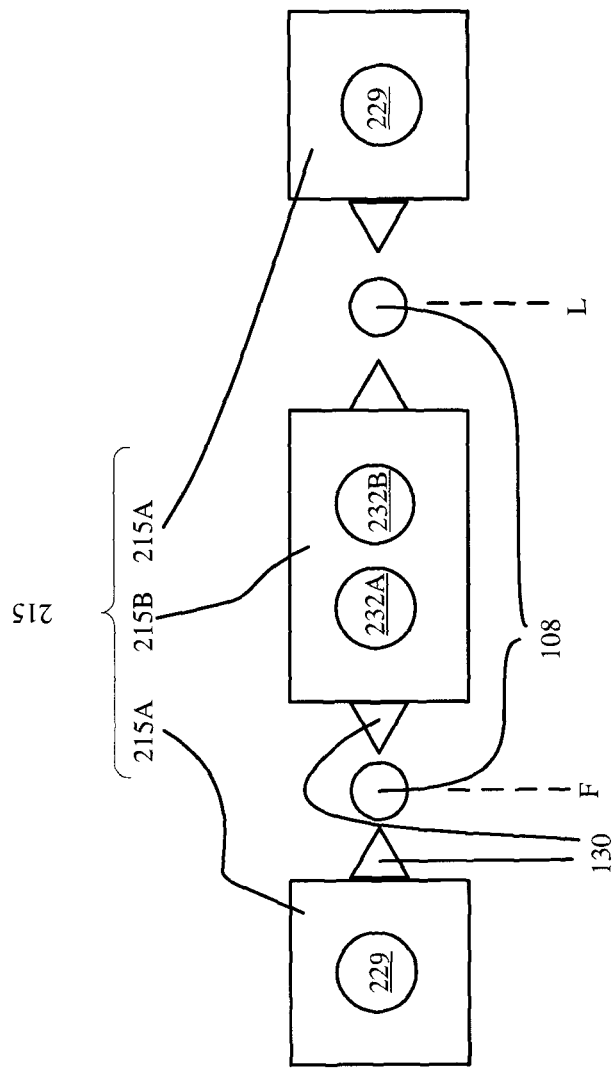
FIG. 2A is a schematic of the arrangement of components of FIG. 2.

FIG. 2 is a section view of a two cavity edge-gated injection molding apparatus in accordance with an embodiment hereof, and is generally indicated by reference numeral 200, features and aspects of which can be used accordingly with the other embodiments, and FIG. 2A is a schematic of the arrangement of components of FIG. 2. In the current embodiment, transfer body 114 and delivery bodies 115 (as shown by FIG. 1) are instead integrally connected to form a combined, or combined delivery body 215. Rather than using a telescopic link to accommodate for heat expansion, combined delivery body 215 is fixed at an upstream end thereof by flange 224 (similar to transfer body 114 (as shown by FIG. 1) that sits in shoulder 125 of clearance bore 126 in mold plate 102, such that thermal expansion of combined delivery body 215 occurs in the direction of cover plate 104. In the absence of telescopic connector 122, thermal expansion is accommodated by the sliding interface between tip assembly 130 and combined delivery body 215. In such an arrangement a spacer is not necessary for maintaining alignment between combined delivery body 215 and tip assembly 130, instead, to maintain alignment between the downstream end of uni-channel 229 and downstream end of bi-channel 232 relative to a channel 143 of a respective tip assembly 130, the length of combined delivery body 215 is calculated such that, in operation, heat expansion of combined each delivery body 215 brings the downstream end of uni-channel 229 and bi-channel 232 into alignment with channel 143 of a respective tip assembly 130.

For discussion purposes, in the current embodiment the cavities 108 of edge-gated injection molding apparatus 200 is laid out in a two by one array, that is, an array having two columns and one row, with cavity 108 on the left (as viewed on page) being the first column F and cavity 108 on the right (as viewed on page) being the second or last column L of the array. In this array, cavity 108 in the first column F of the array and cavity 108 in the last column L of the array are considered to be adjacent to each another. Referring to cavity 108 in the first column F of the array, combined delivery body 215 is a unidirectional combined delivery body 215A that is positioned outside of the first column F of the array. Unidirectional combined delivery body 215A is provided with a uni-channel 229 in fluid communication with a manifold outlet 220. A tip assembly 130 is coupled to a downstream end of unidirectional combined delivery body 215 for delivering a stream of molding material to cavity 108 in the first column F of the array via gate 109A. Referring to cavity 108 in the last column L of the array, delivery body 215 is another unidirectional combined delivery body 215 that is positioned outside of the last column L of the array for delivering a stream of molding material to cavity 108 in the last column L of the array via gate 109B.

As discussed above, each cavity insert 103 is provided with two gates 109A, 109B. In order to deliver molding material to gate 109B of cavity 108 in the first column F of the array and to gate 109A of cavity 108 in the last column L of the array combined bidirectional delivery body 215B is positioned between cavity 108 in the first column F of the array and cavity 108 in the last column L of the array. In the current embodiment combined bidirectional delivery body 115B has two inlets 231A and 231B, with inlet 231A being in fluid communication between a respective manifold outlet 220 and first bi-channel 232A, and inlet 231B being in fluid communication between a respective manifold outlet 220 and second bi-channel 232B. At a downstream end of each bi-channel 232A, 232B, a tip assembly 130 is coupled to each side of combined bidirectional delivery body 215B. Tip assembly 130 coupled to the left side of combined bidirectional delivery body 215B delivers a stream of molding material to gate 109B on the right side of cavity 108 in the first column F of the array, whereas tip assembly 130 coupled to the right side combined bidirectional delivery body 215B delivers a stream of the molding material to mold gate 109A on the left side of mold cavity 108 in the last column L of the array. In such an arrangement each cavity 108 of the array receives a stream of molding material from two delivery bodies 215; one stream from a bidirectional delivery body 215B and the other from a unidirectional delivery body 215A.

Rather than sizing molding material channels to affect molding material flow distribution between the pair of gates 109A, 109B leading to each cavity 108, manifold 213 is configured such that the single stream of molding material entering manifold 113 via manifold inlet 112 is divided into four manifold outlets 220, each of which having substantially the same cross-sectional area. In this arrangement manifold 113 is configured such that molding material is divided substantially evenly between each manifold outlet 220 and subsequently each gate 109.

Figure 3:
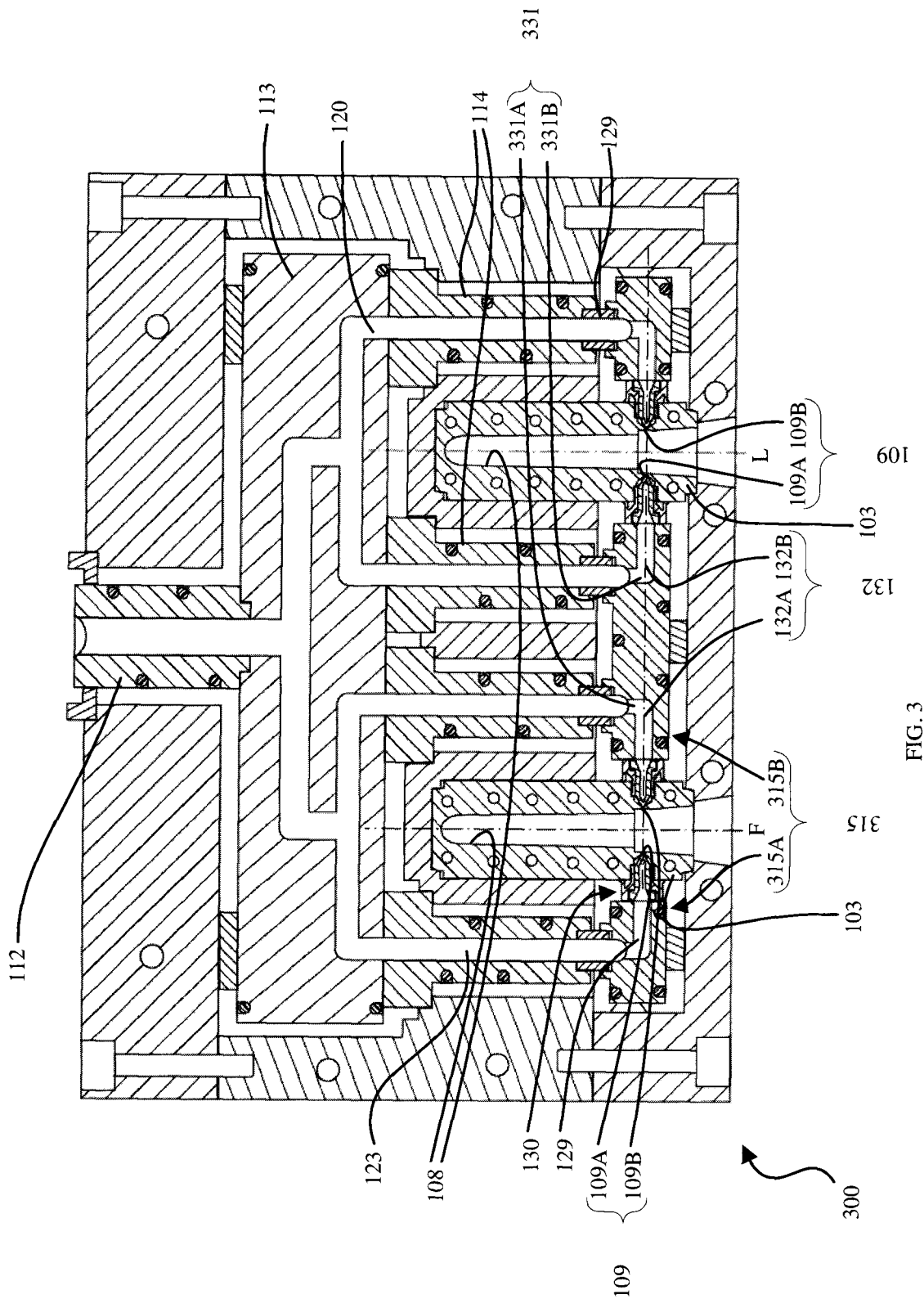
FIG. 3 is a sectional view of a two cavity edge-gated injection molding apparatus in accordance with another embodiment of the present disclosure.
Figure 3A:
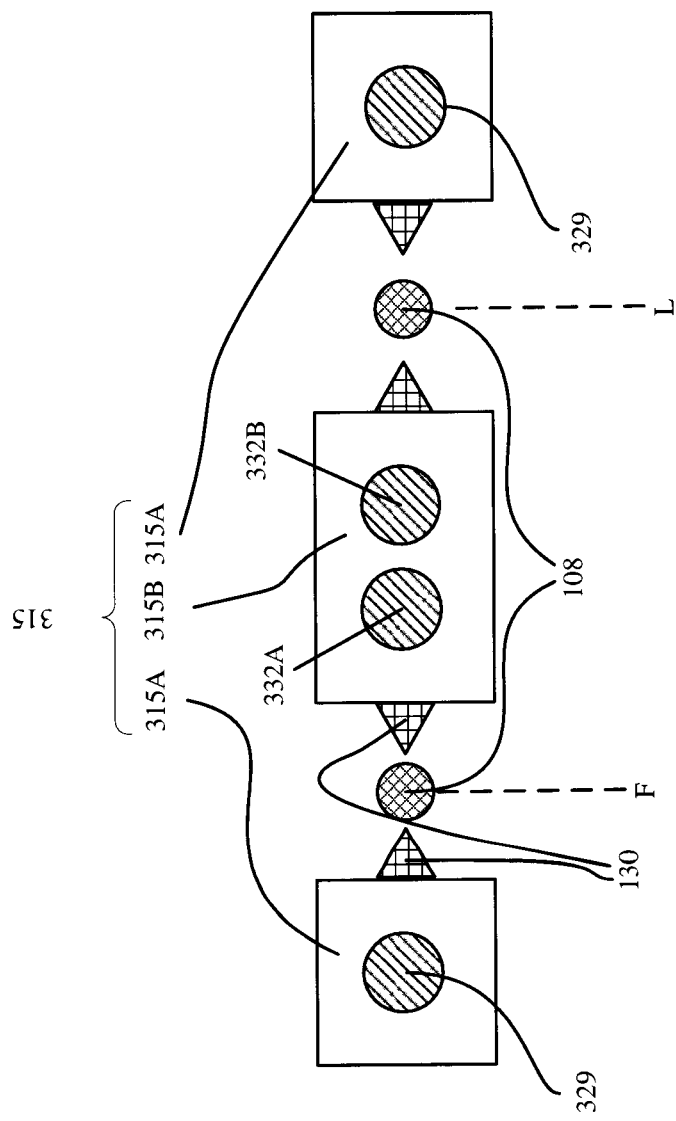
FIG. 3A is a schematic of the arrangement of components of FIG. 3.

FIG. 3 is a section view of a two cavity edge-gated injection molding apparatus in accordance with an embodiment hereof and is generally indicated by reference numeral 300, features and aspects of which can be used accordingly with the other embodiments, and FIG. 3A is a schematic of the arrangement of components of FIG. 3. Similar to the embodiment of FIG. 1 transfer body 114 and delivery body 115 are separate pieces which are coupled together via telescopic connector 122. Whereas, similar to the embodiment of FIG. 2, manifold 113 is configured such that molding material entering manifold 113 via manifold inlet 112 is divided evenly between each of four manifold outlets 120.

As discussed above having regard to FIG. 1, transfer body 114 is provided to deliver molding material from a respective manifold outlet 114 to a respective delivery body 115. For discussion purposes, in the current embodiment 108 of edge-gated injection molding apparatus 300 are laid out in a two by one array, that is, an array having two columns and one row, with cavity 108 on the left (as viewed on page) being the first column F of the array, and cavity 108 on the right (as viewed on page) being the second or last column L of the array. In this array, cavity 108 in the first column F of the array and cavity 108 in the last column L of the array are considered to be adjacent to each another. Referring to cavity 108 in the first column F of the array, the delivery body is a unidirectional delivery body 315A that is positioned outside of the first column F of the array. Unidirectional delivery body 315A is provided with a uni-channel 329 in fluid communication with transfer body channel 123. A tip assembly 130 is coupled to a downstream end of unidirectional delivery body 115A for delivering a stream of molding material to the mold cavity 108 in the first column F of the array via gate 109A. Referring to the cavity 108 in the last column L of the array, the delivery body is another unidirectional delivery body 315A that is positioned outside of the last column L of the array for delivering a stream of molding material to the mold cavity 108 in the last column L of the array via gate 109B.

As discussed above, each cavity insert 103 is provided with two gates 109A, 109B]. In order to deliver molding material to gate 109B of cavity 108 in the last column L of the array, and to gate 109A of cavity 108 in the last column L of the array, bidirectional delivery body 315B is positioned between adjacent columns of the array. In the present embodiment, a bidirectional delivery body 315B is positioned between cavity 108 in the first column F of the array and cavity 108 in last column L of the array. In the current embodiment bidirectional delivery body 315B has a two of inlets 331A, and 331B each of which is in fluid communication between a respective bi-molding material channel 132A, 132B, and a respective transfer channel 123 provided for in a separate transfer body 114. At a downstream end of each bi-channel 332A, 332B, a tip assembly 130 is coupled to each side of bidirectional delivery body 315B. Tip assembly 130 is coupled to the left side of bidirectional delivery body 315 delivers a stream of molding material to gate 109B on the right side of mold cavity 108 in the first column F of the array, tip assembly 130 coupled to the right side of bidirectional delivery body 315 delivers a stream of the molding material to mold gate 109A on the left side of cavity 108 in the last column L of the array. In such an arrangement each cavity 108 of the array receives a stream of molding material from two delivery bodies; one from bidirectional delivery body 315B and the other from a unidirectional delivery body 315A. In the current embodiment, not only is a single molding material stream divided into four respective equally sized manifold outlets 120 (two per mold cavity) greater control of the molding material exiting each outlet 120 is achieved by providing a separate transfer body 114 for delivering molding material to each tip assembly 130 and subsequently each gate 109. For example, if it is determined that bidirectional delivery body 315B delivers a greater amount of molding material to gate 109B of mold cavity 108 in the first column F of the array than to gate 109A of mold cavity 108 in the last column L of the array, than the temperature of transfer body 114 associated with gate 109B of cavity 108 of the first column F of the array can be decreased which will increase the viscosity of molding material flowing therethrough. Accordingly, the higher viscosity material will alter the balance of molding material flow between tip assembly 130 associated with gate 109B of cavity 108 in the first column F of the array and tip assembly 103 associated with gate 109A of cavity 108 in the last column L of the array such that less molding material flows from tip assembly 130 associated with gate 109B of cavity 108 of the first column F of the array which can balance the fill rate between adjacent cavities 108.

Figure 4:
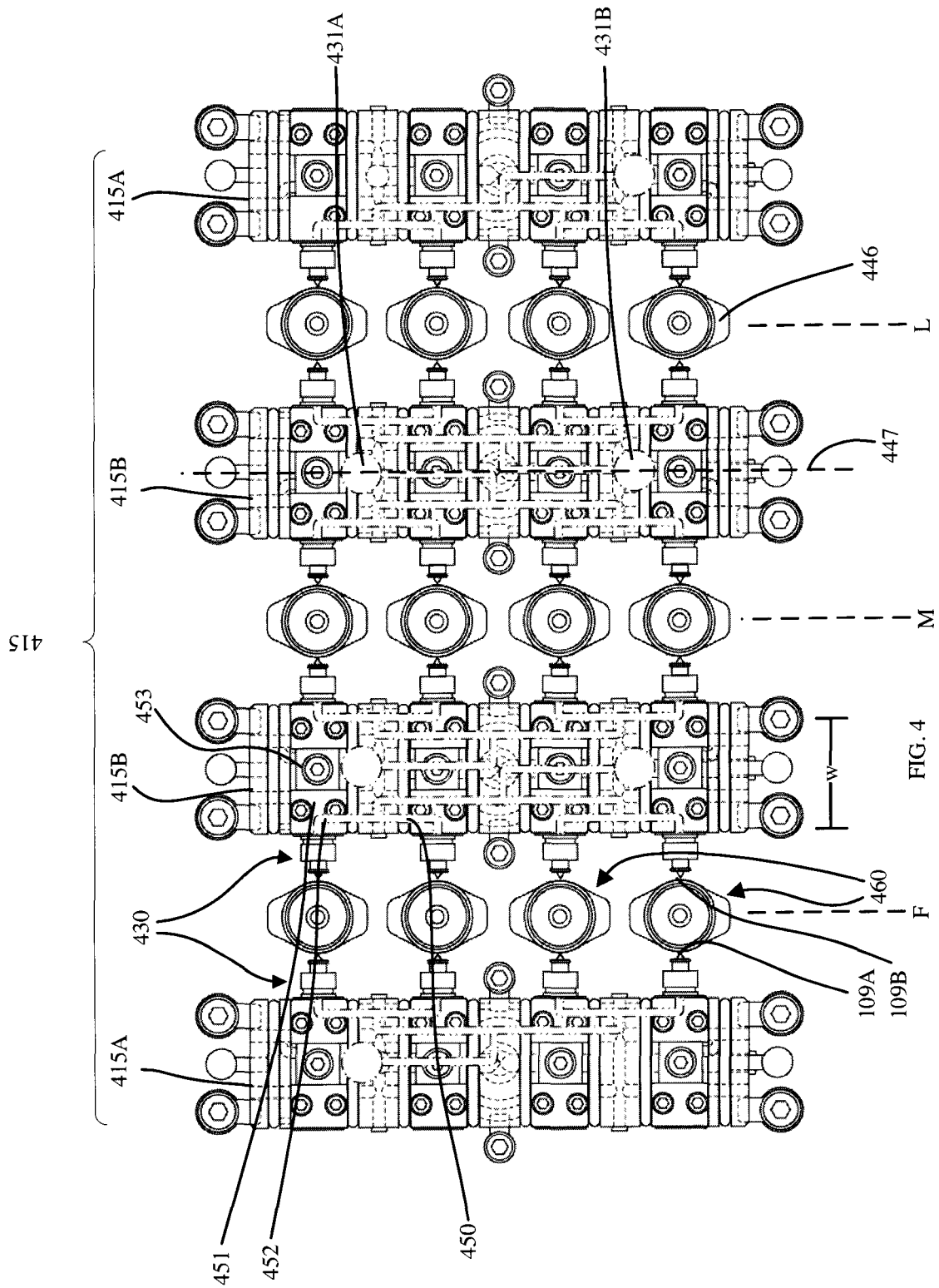
FIG. 4 is a bottom view of delivery bodies and molded articles molded thereby accordance with an embodiment of the present disclosure removed from the injection molding system.
Figure 4A:
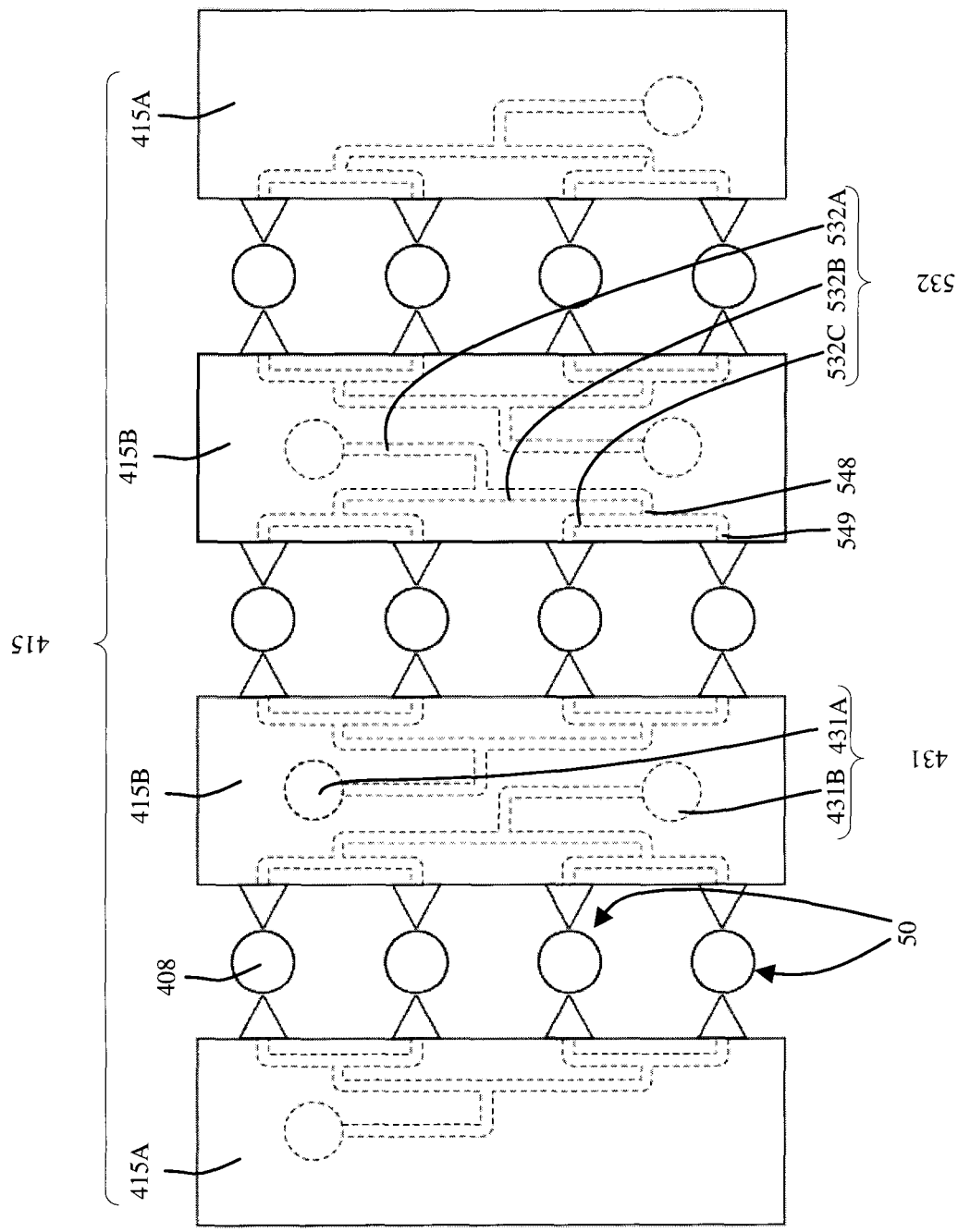
FIG. 4A is a schematic of the arrangement of components of FIG. 4.

FIG. 4 is a bottom view of delivery bodies and molded articles molded thereby in accordance with an embodiment of the present disclosure removed from the injection molding system, features and aspects of which can be used accordingly with the other embodiments, and FIG. 4A is a schematic of the arrangement of components of FIG. 4. In FIG. 4 molded articles 446 are shown in place of cavity inserts/cavities. Although not shown in FIG. 4, a person of ordinary skill in the art would understand that molded articles 446 would be formed in respective cavities 408, shown in FIG. 4A which are functionally similar to cavities 108 discussed in the previous embodiments. The specific configuration of delivery bodies 415, tip assemblies 130 in the current embodiment are similar to injection manifolds etc. depicted in U.S. patent application 61/612,149 which is incorporated herein by reference. In each of the previous examples mold cavities are laid out in an array having two or more columns and only one row. While this simple arrangement is illustrative of the present disclosure, in order to increase the cavitation density of a mold, the injection molding apparatus can be laid out in array two or more columns and more than one row.

In the embodiment of FIG. 4, cavities 408 are laid out in an array of three columns by four rows. Such an arrangement is similar to that of FIG. 1; however rather than feed a single cavity mold cavity 108, in the case of unidirectional delivery body of FIG. 1, or two cavities 108, in the case of bidirectional delivery body of FIG. 1, in the embodiment of FIG. 4 each unidirectional delivery body 415A feeds four cavities 408 and each bidirectional delivery body 415B feeds eight cavities 408, more specifically, four cavities 408 positioned on the left side of bidirectional delivery body 415B and four cavities 408 positioned on the right side of bidirectional delivery body 415B. That is, unidirectional delivery body 415A has four tip assemblies 430, all pointing in substantially same direction, each tip assembly 430 for delivering moldable material to a different cavity 108 of a column of cavities 108 and bidirectional delivery body 415B has four rows of tip assemblies 430, each row having two tip assemblies 430, tip assemblies 430 of each row are pointing in substantially opposite directions. Similar to the embodiment of FIG. 3, each unidirectional delivery body 415A is in fluid communication with a single transfer body (not shown in FIG. 4), and each bidirectional delivery body 415B has two inlets 431A, 431B, with each inlet 431A, 431B being positioned along a centerline 447 of bidirectional delivery body 415, and in fluid communication a separate transfer body 414, one transfer body 114 for providing molding material to cavities 408 positioned on the left side of bidirectional delivery body 415B via inlet 431A, and the other to provide molding material to cavities 408 positioned on the right side of bidirectional delivery body 415B via inlet 431B. Positioning inlets 431A, 431B along centerline 447 is advantageous in that it allows the width W of bidirectional delivery body 415B to be narrower than that of bidirectional delivery body 315B of FIG. 3, in which inlets 331A, and 331B are positioned on different sides of the centerline 447 of bidirectional delivery body 315B. Continuing with FIG. 4, reducing the width W of bidirectional delivery body 415B allows a closer pitch spacing between adjacent columns of the array, thus increasing the overall cavitational density of the injection molding apparatus. In the current embodiment the width W of bidirectional delivery body 315B is substantially the same as that of unidirectional delivery body 315A. In the current embodiment a manifold (not shown in FIG. 4) receives a stream of molding material from a source and divides it into six manifold outlets such that each delivery body inlet, whether associated with a unidirectional delivery body 415A or a bidirectional delivery body 415B, receives substantially 50% of the molding material required to fill four molded articles 446 from a respective manifold outlet (not shown) via a respective transfer body (also not shown).

Figure 5A:
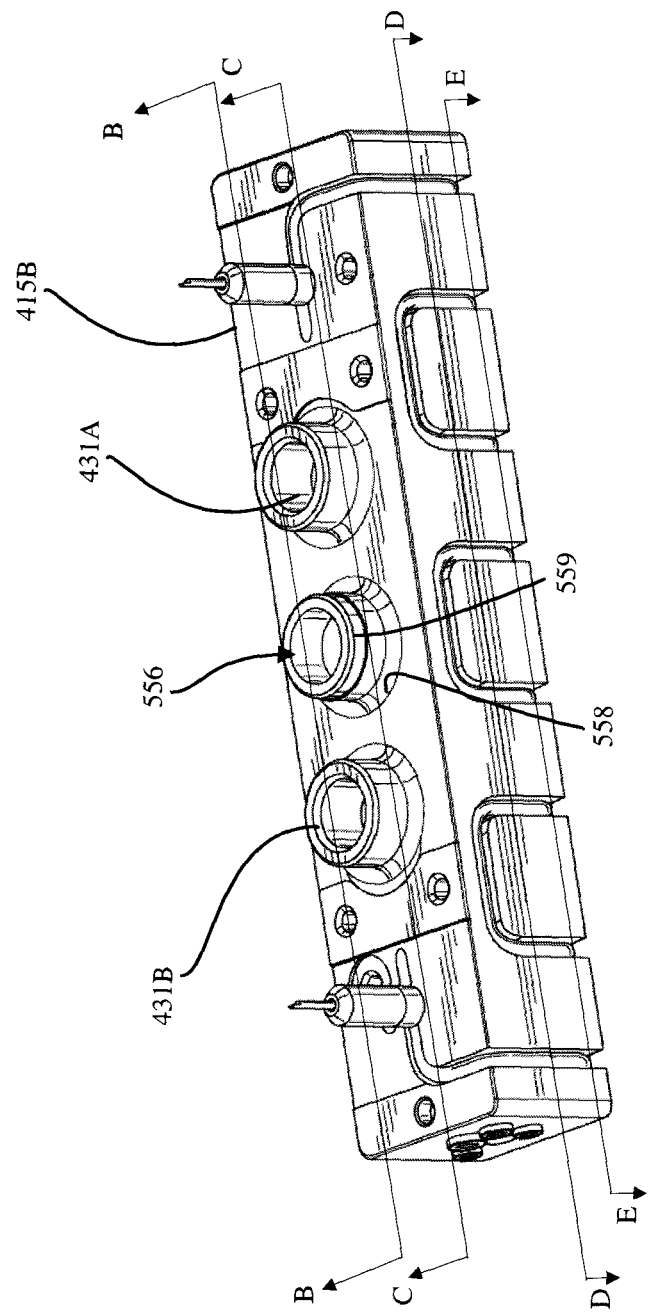
FIG. 5A is a perspective view of the bidirectional delivery of FIG. 4.
Figure 5B:
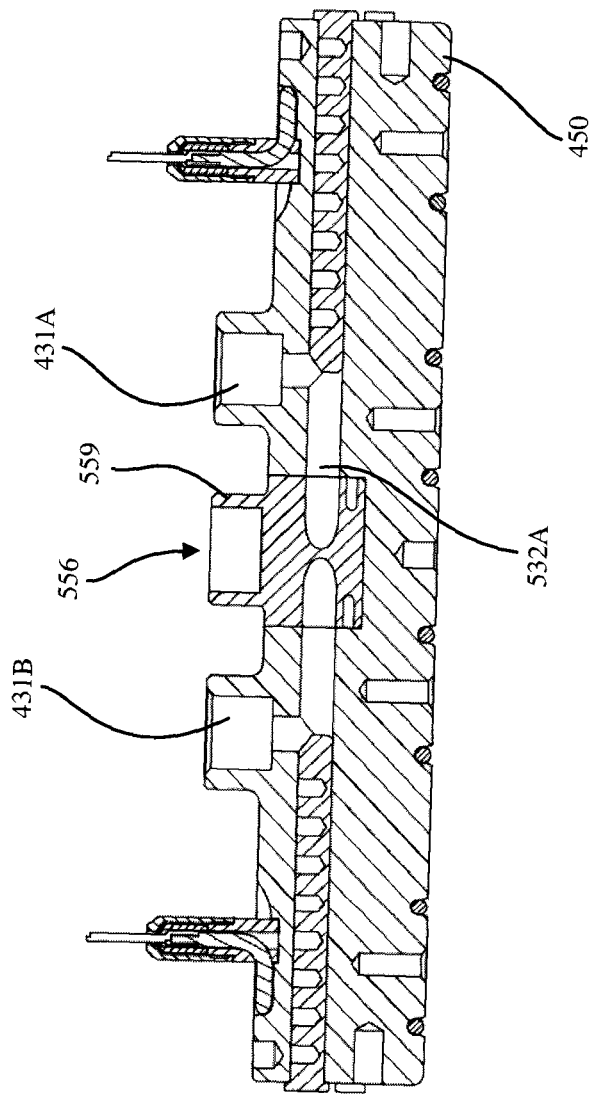
FIG. 5B is sectional view of the bidirectional delivery body of FIG. 4 taken along line B-B.
Figure 5C:
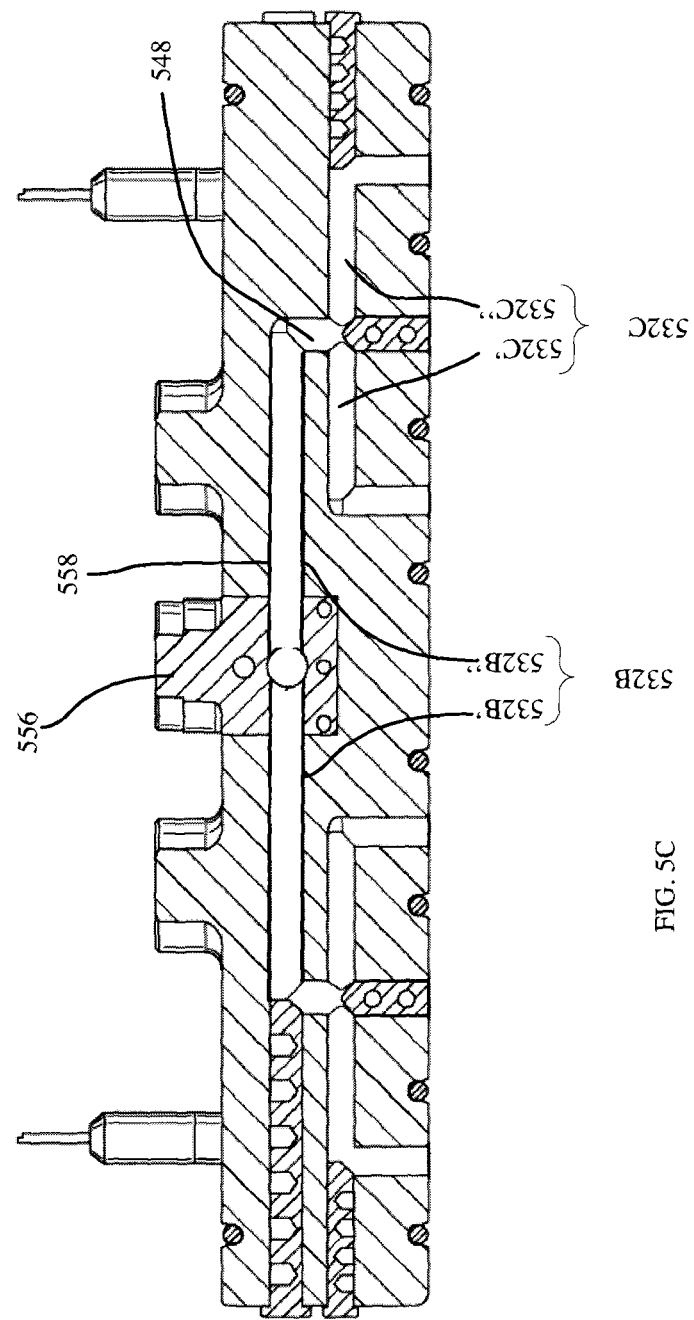
FIG. 5C is sectional view of the bidirectional delivery body of FIG. 4 taken along line C-C.
Figure 5D:
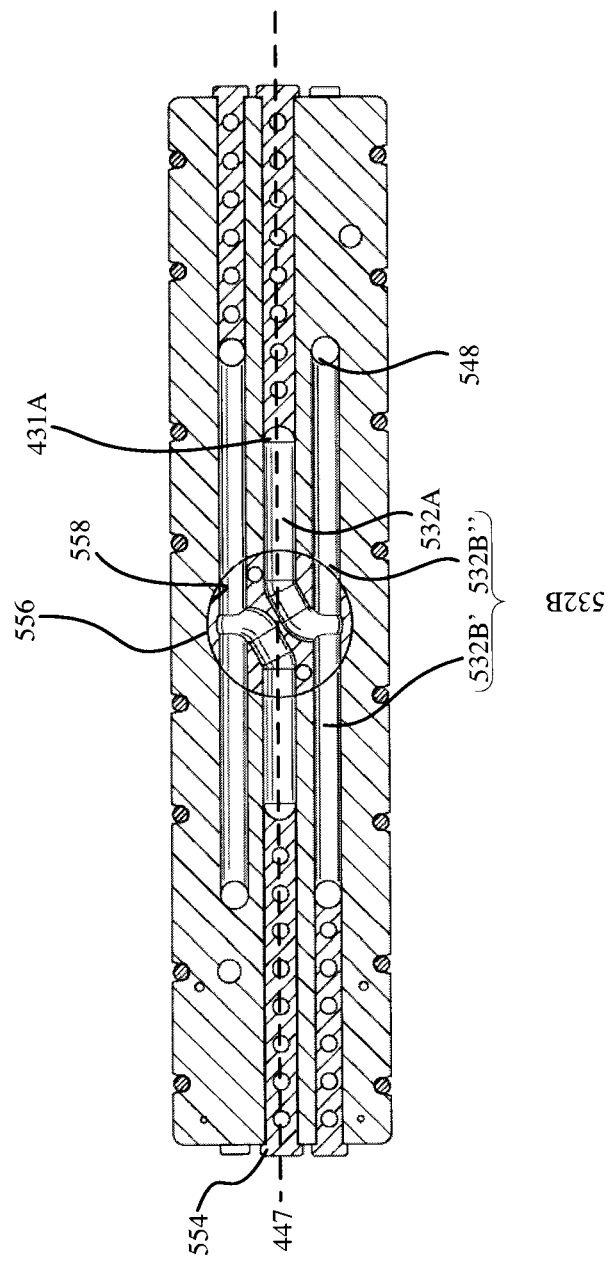
FIG. 5D is a sectional view of the bidirectional delivery body of FIG. 4 taken along line D-D.

Referring to bidirectional delivery body 415B, as shown schematically in FIG. 4A and also to FIGS. 5A-5E, in which FIG. 5A is a perspective view of the bidirectional delivery of FIG. 4, FIG. 5B is sectional view of the bidirectional delivery body of FIG. 4 taken along line B-B, FIG. 5C is sectional view of the bidirectional delivery body of FIG. 4 taken along line C-C, FIG. 5D is a sectional view of the bidirectional delivery body of FIG. 4 taken along line D-D, and FIG. 5E is a sectional view of the bidirectional delivery body of FIG. 4 taken along line E-E. To ensure molding material balance between four cavities 408, bidirectional delivery body 415B is provided with a network of bi-molding material channels. For example, referring to the four cavities 408 on the left side of bidirectional delivery body 415, molding material entering inlet 431A is directed into a primary channel 532A (see FIG. 5B and FIG. 5D) that extends along the center-line 447 of bidirectional delivery body 415B. At the downstream end thereof, primary channel 532A turns away from center line 447 and branches into two secondary channels 532W, 532W extending in substantially opposite directions (secondary molding material channels 532B', 532B" are generically referenced as secondary channel 532B) (see FIG. 5C and FIG. 5D). At the downstream end of each secondary channel 532B molding material experiences a level change, as shown at 548, and branches into two tertiary channels 532C', 532C" extending in substantially opposite directions (see FIG. 5B, FIG. 5D, and FIG. 5E) positioned beneath a respective secondary molding material channel 532W, 532W (tertiary channels 532C', 532C" are generically referenced as tertiary channel 532C). At a downstream end thereof, each tertiary channel 532C reorients the flow of molding material through an outlet 549 (see FIG. 5B) which is in fluid communication with tip assembly 430 that is configured to redirect the flow of molding material from a bottom surface 450 of bidirectional delivery body 415B to a respective mold cavity 408 via a gate 109B. That is, in the embodiment of FIGS. 4, 4A, and 5A-5F, primary channel 532A, secondary channels 532B, and tertiary channels 532C form a network of channels 532 and each network of channels 532 is fed by one inlet 431; each unidirectional delivery body 415A has at least one network of channels 532; each bidirectional delivery body 415B has at least two networks of channels 532. In the current embodiment, bidirectional delivery body 415B is manufactured from a solid block, and primary, secondary, and tertiary channels 532A, 532B, 532C are formed as a series of bores extending into bidirectional delivery body 415B, and to direct the flow of molding material, a plurality of plugs, such as plug 554, which are inserted in to the bores that define respective primary, secondary, and tertiary channels 532A, 532B, 532C.

As shown in FIG. 4, and also in FIG. 11, in the current embodiment tip assembly 430 further includes a diverter block 451 secured to bottom surface 450 of bidirectional delivery body 415B. Diverter block 451 has a channel 452 extending therethrough that reorients the flow of molding material through a 90° rotation from the bottom of bidirectional delivery body 515B to tip body channel 438. In the current embodiment, a wedge 453 is also secured to bottom surface 450 of bidirectional delivery body 415B which bears against opposite facing tip assemblies 430. Specifically, wedge 452 bears against opposing diverter blocks 450 (diverter block 450 associated with the left side of bidirectional delivery body 415B and diverter body 450 associated with the right side of bidirectional delivery body 415B) to maintain a fluid seal between diverter block channel 452 and tip body channel 438.

It should be understood that in order to feed molding material to the four mold cavities 408 on the right side of bidirectional delivery body 415B, molding material entering inlet 431B and flows through a network of bi-molding material channels that are oriented 180 degrees to the network of bi-molding material channels 432 associated with inlet 431A.

It should also be understood that unidirectional delivery bodies 415 have a channel arrangement similar to the channel arrangement in fluid communication with one of inlets 431A, and 431B. Referring to unidirectional delivery body 414 positioned outside the first column F of the array, to feed molding material to the mold cavities 408 on the right side of unidirectional delivery body 415A, molding material enters an inlet positioned similar on unidirectional delivery body 415A to inlet 431B of bidirectional delivery body 415B and flows through the network of uni-molding material channels to tip assemblies 130 in fluid communication with gates 109A on the right side of respective mold cavities 408 in the first column F of the array. Referring to unidirectional delivery body 414 positioned outside the first column L of the array, to feed molding material to the four mold cavities 408 on the left side of unidirectional delivery body 415A, molding material enters an inlet positioned similar on unidirectional delivery body 415A to inlet 431B of bidirectional delivery body 415B and flows through the network of uni-molding material channels to tip assemblies 130 in fluid communication with gates 109B on the left side of respective mold cavities 408 in the last column L of the array.

Figure 5F:
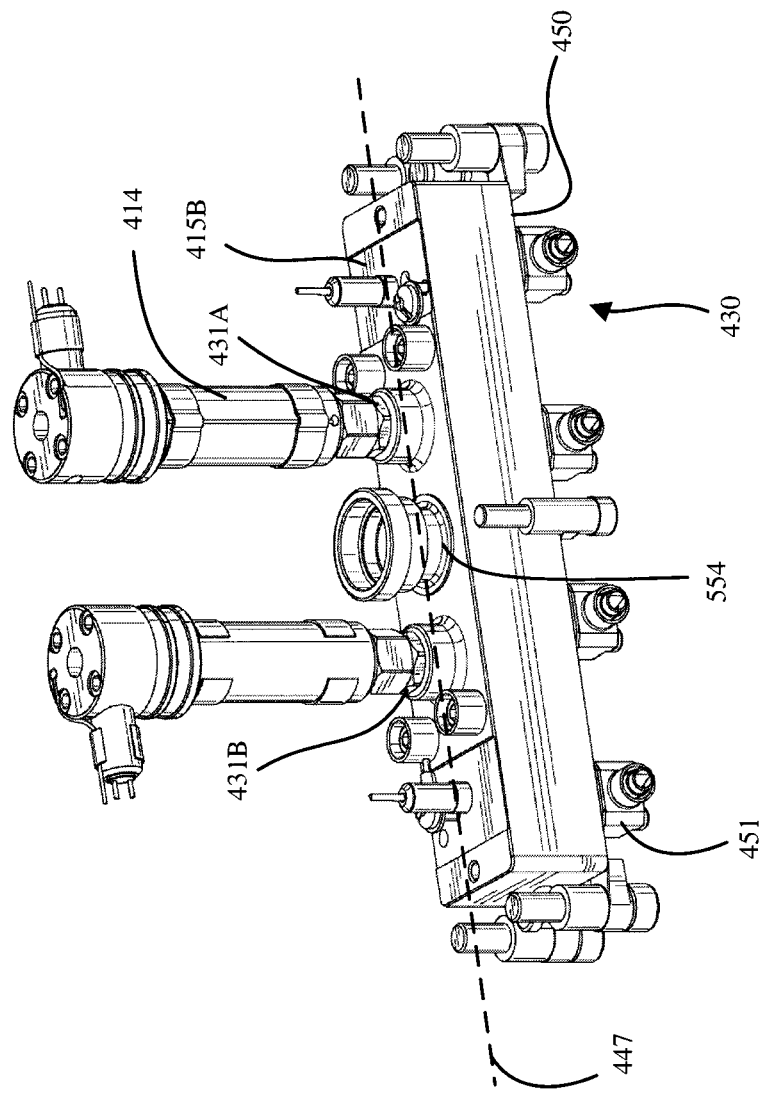
FIG. 5F is a perspective view of the bidirectional delivery body of FIG. 4 with transfer bodies and tip assemblies.

The aforementioned molding material channel configuration is as follows: 1 primary channel 532A×2 secondary channels 532W, 532B"×2 tertiary channels 532C', 532C" (one per each secondary channel 532B', 532B")=4 delivery body outlets 549 (see FIG. 4A), with each outlet 549 in fluid communication with a respective cavity 508. FIG. 5F is a perspective view of bidirectional delivery body 415B of FIG. 4 depicting four tip assemblies 430 positioned on the right side of bidirectional delivery body 415B and two transfer bodies 414, one coupled to each inlet 431A, 431B.

Figure 6:
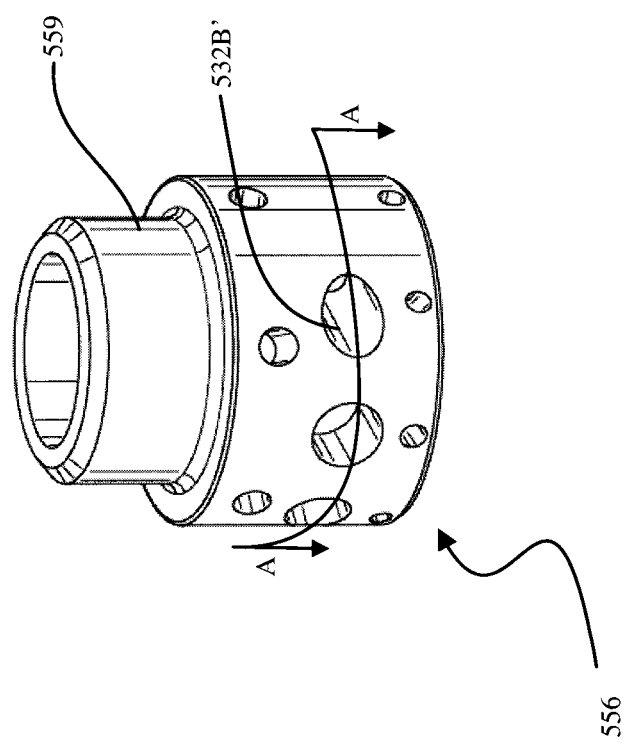
FIG. 6 is a perspective view of a plug removed from the bidirectional delivery of FIG. 4.
Figure 6A:
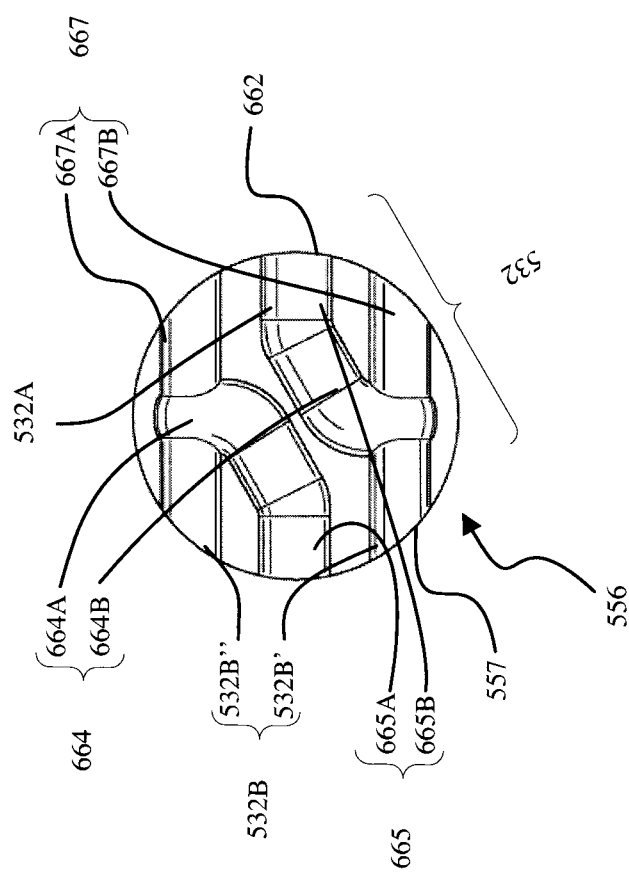
FIG. 6A is sectional view through the plug of FIG. 6 taken along line A-A.

Referring to FIGS. 5A-F a center plug, or plug 556 is provided in bidirectional delivery body 415B to facilitate placement of two inlets 431A, 431B along centerline 447 of delivery body 415B rather than back to back or placement of each inlet 331A, 331B in-line between adjacent mold cavities 108 as shown in FIG. 3. Referring also to FIG. 6 which is a perspective view of plug 556 depicted in FIGS. 5A-D with FIG. 6A being a section A-A through FIG. 6. Plug 556 has a cylindrical body portion 557 that is received in a corresponding bore 558 in bidirectional delivery body 415B. A locating flange 559 extends from body portion 557 to mate with a corresponding feature in a mold plate, (such as mold plate 102 shown in FIG. 1) to assist in positioning bidirectional delivery body 415B. Plug 556 defines a junction 662 between each primary molding material channel 532A and the pair of secondary molding material channels 532W, 532W extending from a downstream end of each primary molding material channel 532A. Junction 662 includes a first interconnecting channel 664A, a second interconnecting channel 664B, a first segment of primary channel 665A, a second segment of primary channel 665B, a first segment of secondary channel 667A, and a second segment of secondary channel 667B, first segment of primary channel 665A forming a portion of the primary channel 532A of the one of the networks of channels 532, first segment of secondary channel 667A forming a portion of secondary channel 532B, of the other of the networks of channels 532, first interconnecting channel 664A interconnecting first segment of primary channel 665A with first segment of secondary channel 667A, second segment of primary channel 665B forming a portion of the primary channel 532A of the other of the networks of channels 532, second segment of secondary channel 667B forming a portion of secondary channel 532B of the other of the networks of channels 532, second interconnecting channel 664B interconnecting second segment of primary channel 665B with second segment of secondary channel 667B. In the embodiment of FIGS. 6 and 6A, Plug 556 is a unitary or one piece plug manufactured by an additive manufacturing process such as laser sintering or the like. In an alternative embodiment, plug 556 may be manufactured from two halves that are brazed or otherwise integrally formed together, with one half of plug 556 having the channel geometry shown in FIG. 6A and the other half or plug 556 having a corresponding mirrored geometry such that complete the peripheral boundary of the portion of primary molding material channel 532A and secondary molding material channels 532W, 532W are formed in plug 556. That is, each half of plug 556 includes a network of troughs such that when the two halves combined to form plug 556, the network of troughs defined the channels of junction 662.

Figure 7:
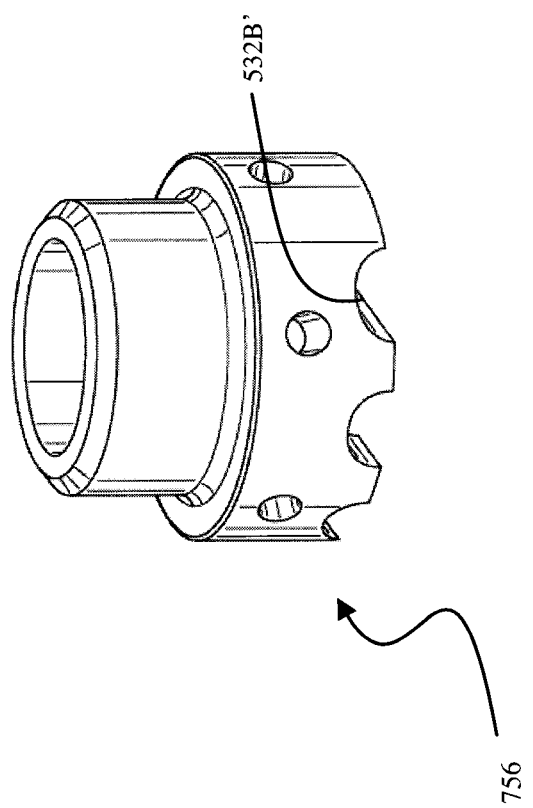
FIG. 7 is perspective view of a plug in accordance with another embodiment of the present disclosure removed from the bidirectional delivery of FIG. 4.
Figure 7A:
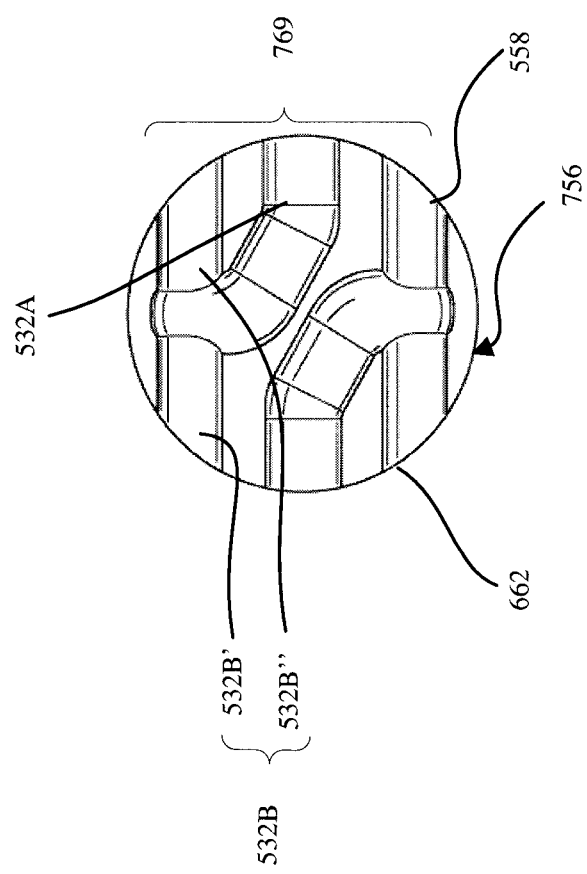
FIG. 7A is a bottom view of the plug of FIG. 7.

FIG. 7 is a perspective view of an alternative embodiment of a center plug, or plug 756 with FIG. 7A being a bottom view of FIG. 7. Features and aspects of the current embodiment can be used accordingly with the other embodiments. Plug 756 of FIG. 7 is similar to plug 556 of FIG. 6, however, in the embodiment of FIG. 7 plug 756 is a half plug having the channel geometry shown in FIG. 7A and bore 558 having a corresponding mirrored geometry such that bore in the delivery body completes the peripheral boundary of the portion of primary molding material channel 532A and secondary molding material channels 532W, 532B" are formed when plug 756 is installed in bore 558. That is, plug 756 includes a network of troughs 769 such that when plug 756 is installed in bore 558, the network of troughs 769 combines with a corresponding network of troughs (not shown) of bore 558 to define the channels of junction 662.

In each of the embodiments of FIGS. 6 and 7 plug 556, 756 may be made from a material that is the same or different than that of delivery body. Further plug 556, 756 can be integrally or, alternatively removably installed in the delivery body.

FIG. 8 is a top view of an eight cavity edge gated injection molding apparatus in accordance with an embodiment hereof, generally indicated by reference numeral 800, in which bidirectional delivery bodies 415B are also used as unidirectional delivery bodies. Features and aspects of the current embodiment can be used accordingly with the other embodiments. FIG. 8A is a section view of FIG. 8 taken along line A-A. FIG. 8B is a perspective view of a portion of injection molding apparatus 800 shown with cavity inserts 803 and support inserts removed. FIG. 8C is the perspective view of FIG. 8B shown with manifold 813 and inlet 812 removed. FIG. 8D is a perspective view of bidirectional delivery body 415B and associated cavity inserts 803.

For discussion purposes, in the current embodiment cavities 808 of edge-gated injection molding apparatus 800 are laid out in a two by four array, that is, an array having two columns and four rows, with the four cavities 808 on the left (as viewed on page) being the first column F of the array and the four cavities 808 on the right (as viewed on page) being the second or last column L of the array. In this array, cavity 808 of a respective row in the first column F and cavity 108 of the same respective row in the last column L are considered to be adjacent to each another.

As mentioned above bidirectional delivery bodies 415B are also used as unidirectional delivery bodies 415 will be referred to as unidirectional delivery body/bodies 415C. Unidirectional delivery body 415C can have the same structure as bidirectional delivery body 415B as discussed having regard to the embodiment of FIG. 4. However, when bidirectional delivery body 415B is used as unidirectional delivery body 415C, rather than deliver molding material to both of inlets 431A, 431B, unidirectional delivery body 415C of FIG. 8 is fed molding material via a respective transfer body 414 to one of inlets 431A, 431B and the other of 431A, 431B is not fed any molding material, rendering the tips being fed by the latter inlet unused.

Figure 8A:
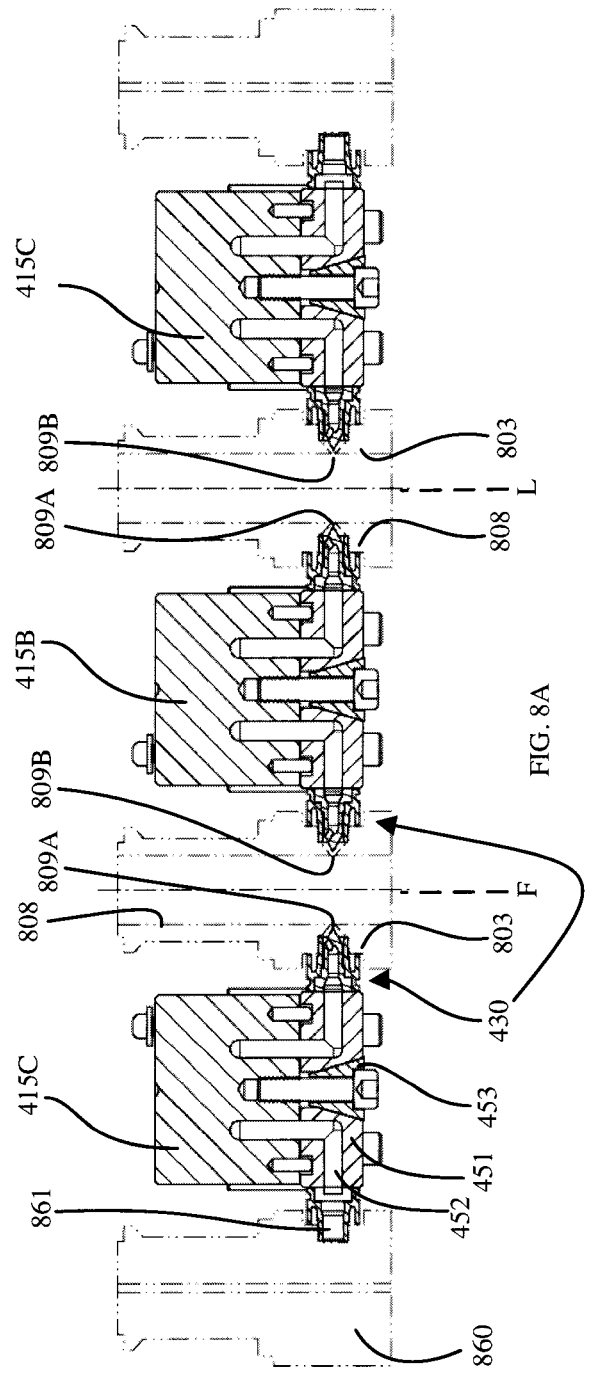
FIG. 8A is a section view of the edge gated injection molding apparatus of FIG. 8 taken along line A-A.
Figure 8B:
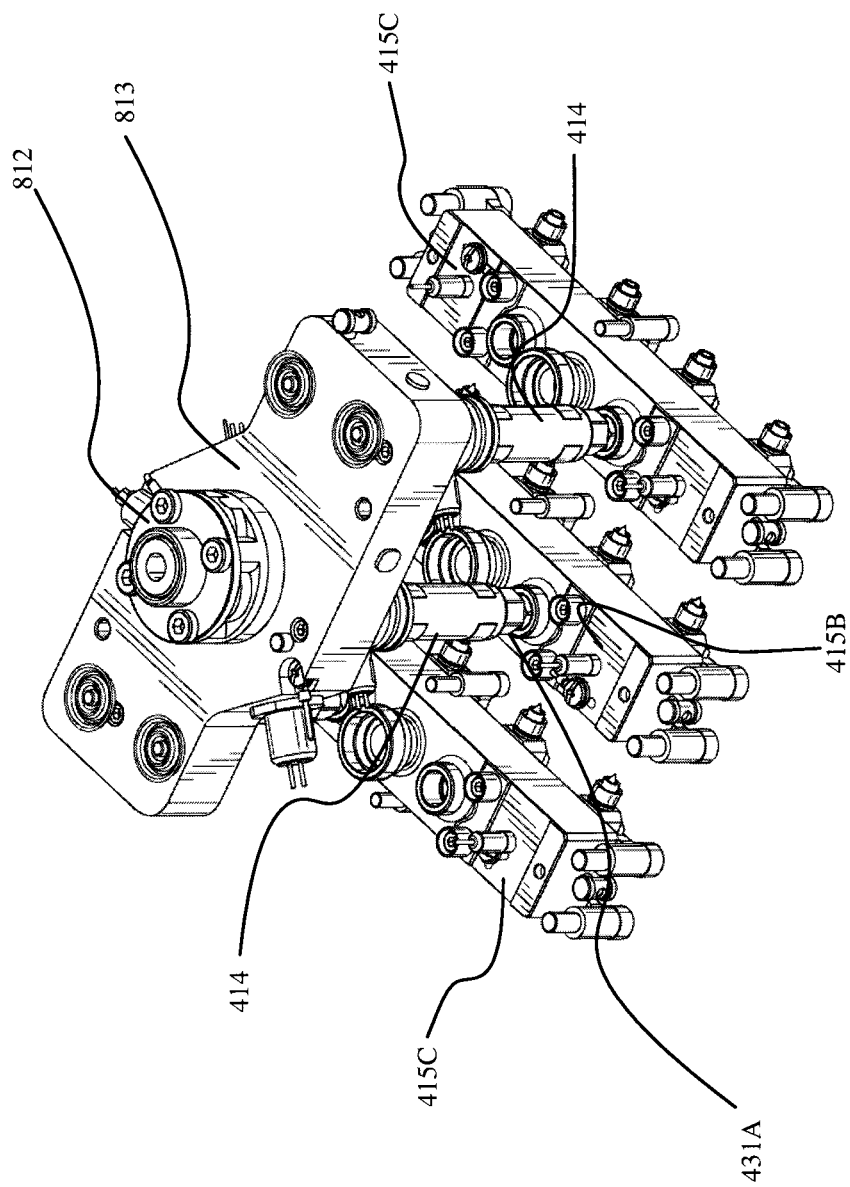
FIG. 8B is a perspective view of a portion of the injection molding apparatus of FIG. 8.
Figure 8C:
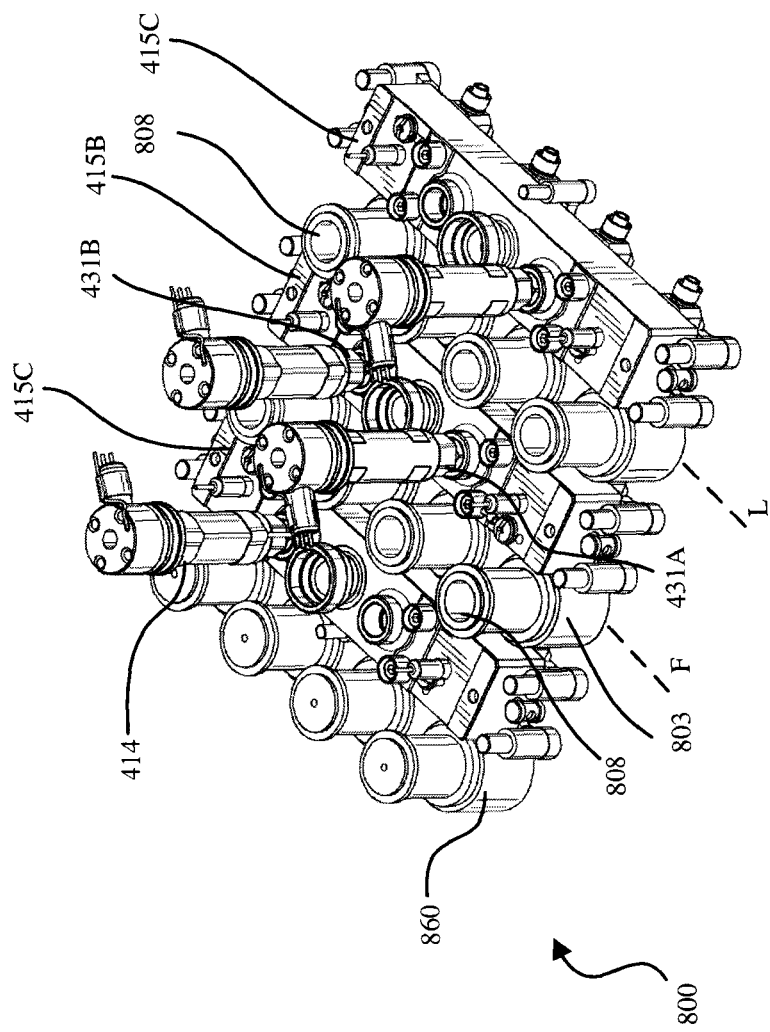
FIG. 8C is the perspective view of the edge gated injection molding apparatus of FIG. 8 with the manifold and inlet removed.

Specifically, referring to FIG. 8A and FIG. 8C, and to unidirectional delivery body 415C positioned outside the first column F of the array, to feed molding material to the mold cavities 808 on the right side of unidirectional delivery body 415C, molding material enters inlet 431B and flows through the network of molding material channels (similar to channels 532 of FIG. 5A to FIG. 5E) to tip assemblies 430 in fluid communication with respective gates 809A on the left side of mold cavities 808 in the first column F of the array. Referring to unidirectional delivery body 415C positioned outside the last column L of the array, to feed molding material to the four mold cavities 408 on the left side of unidirectional delivery body 415C, molding material enters inlet 431A and flows through the network of molding material channels (opposite to channels 532 of FIG. 5A to FIG. 5E) to tip assemblies 430 in fluid communication with respective gates 809B on the right side of respective mold cavities 808 in the last column L of the array.

Figure 8D:
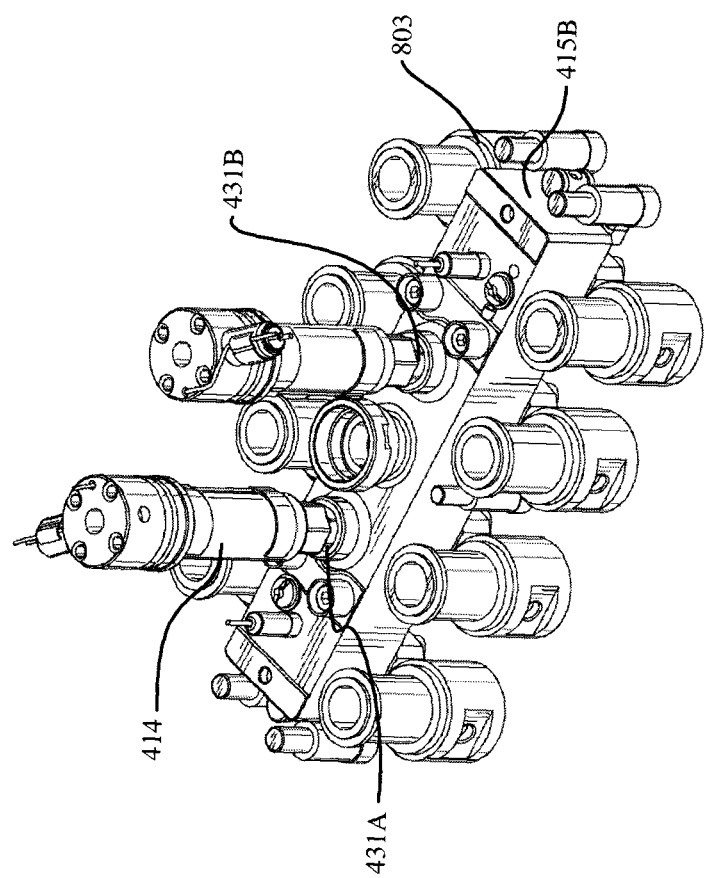
FIG. 8D is a perspective view of the bidirectional delivery body from the edge gated injection molding apparatus of FIG. 8.

Similar to the previous embodiments, each cavity insert 803 is provided with two gates 809A and 809B. In order to deliver molding material to respective gates 809B of cavities 808 in the first column F of the array and to respective gates 809A of cavities 808 in the last column L of the array, bidirectional delivery body 415B is positioned between cavities 808 in the first column F of the array and cavities 808 in the last column L of the array. Referring to FIG. 8C and FIG. 8D, bidirectional delivery body 415B has two inlets 431A and 431B, to feed molding material to the mold cavities 808 on the left side of bidirectional delivery body 415B, molding material enters inlet 431A and flows through the network of molding material channels (similar to channels 532 of FIG. 5A to FIG. 5E) to tip assemblies 430 in fluid communication with respective gates 809B on the right side of mold cavities 808 in the first column F of the array, and to feed molding material to the four mold cavities 808 on the right side of bidirectional delivery body 415B, molding material enters inlet 431B and flows through the network of molding material channels (opposite to channels 532 of FIG. 5A to FIG. 5E) to tip assemblies 430 in fluid communication with respective gates 809A on the right side of respective mold cavities 808 in the last column L of the array.

In the current embodiment, manifold 813 receives a stream of molding material via inlet 812 and divides it evenly between four outlets (not shown in FIG. 8 and FIG. 8A to FIG. 8D), with one outlet being in fluid communication with inlet 431B of unidirectional delivery body 425C positioned outside the first column F of the array, one outlet being in fluid communication with inlet 431A of unidirectional delivery body 425C positioned outside the last column L column of the array and the remaining two outlets in fluid communication with respective inlets 431A and 431B of bidirectional delivery body 415B. Accordingly, in this arrangement each cavity 808 receives a stream of molding material from two delivery bodies 415; one stream from a bidirectional delivery body 415B and the other from a unidirectional delivery body 815C.

Referring to FIG. 8, FIG. 8A, and FIG. 8C, injection molding apparatus 800 includes support inserts 860. Specifically, one column of four support inserts 860 is positioned relative to unidirectional delivery body 415C that is outside of the first column F of the array, and another column of four support inserts is positioned relative to unidirectional delivery body 415C that is outside of the last column L of the array. In the current embodiment, the pitch spacing of support inserts 860 is equal to that of cavity inserts 803. Support inserts 860 have an outer profile similar to that of cavity inserts 803 and would be received in a corresponding bore in a mold plate, such as mold plate 102 shown in FIG. 1, and also include also include respective first sealing surface 838 and circumferential sealing surface 839. Support inserts 860 are used as place holders to enable the use of bidirectional delivery bodies 415, as unidirectional delivery bodies 415C. In an embodiment (not shown) support inserts 860 are made from the same material as cavity inserts 803, and also have the same internal geometry as cavity inserts 803 thus allowing a respective support insert 860 to be used as a spare cavity insert 803 in the event that a cavity insert 803 becomes damaged.

Referring to FIG. 8A and unidirectional delivery body 415C positioned outside the first column of the array, wedge 453 bears against opposite facing tip assemblies 430; tip assembly 430 on the left side of unidirectional delivery body 415C applies force against support insert 860, whereas tip assembly 430 on the right side of applies force against cavity insert 803 such that unidirectional delivery body 415C is held in place between cavity inserts 803 in the first column of the array and support insert 860 by opposite facing tip assemblies 430. In the current embodiment tip assembly 430 associated with support insert 860 has a blank tip body 861, that is blank tip body 861 does not have a melt channel extending therethrough.

In each of the above examples the specific delivery body and tip assembly 130 arrangement is shown by way of example and not limitation. Further non-limiting examples of tip and delivery body arrangements can be found in the following examples, U.S. Pat. No. 4,981,431, which is incorporated by reference herein, depicts a one piece tip that is threadably coupled to an edge gating nozzle body that creates face seal with a corresponding cavity insert 103. In this arrangement the tip can be said to be fixed to a delivery body and slidable relative to a corresponding cavity insert. In another embodiment tip assembly is a two piece injection tip that is threadably retained to delivery body by way of a separate transfer seal, such an arrangement can be found in U.S. Pat. No. 7,179,081 also incorporated by reference herein. In this arrangement the tip can be considered fixed to the delivery body by way of a transfer seal, and is also fixed to cavity insert 103 by way of the circumferential engagement between transfer seal sealing diameter and cavity insert bore. In still a further embodiment a tip seal arrangement such as depicted in U.S. Pat. No. 7,794,228 which is incorporated herein by reference, can also be used in embodiments hereof without diverting from the scope of the disclosure. While tip assemblies 130 are shown projecting at a 90° angle to the axial centerline 110 of each cavity 108, tip assemblies may also project at an angle to axial centerline in embodiments where it can be disadvantageous to inject molding material directly at the mold core.

The use of the terms rows and columns throughout this disclosure is not intended to limit the scope of the disclosure, but is meant to convey the relationship between the positions and orientations of the delivery bodies and cavities.

While various embodiments according to the present disclosure have been described above, it should be understood that they have been presented by way of illustration and example only, and not limitation. It will be apparent to persons skilled in the relevant art that various changes in form and detail can be made therein without departing from the spirit and scope of the disclosure. For example, where suitable, an apparatus can use a combination of combined delivery body 115A, 115B and transfer body 114 connected to bidirectional delivery body 115B or unidirectional delivery body 115A. As another example, where suitable, combined delivery body 115A, 115B can be replaced by transfer body 114 connected to bidirectional delivery body 115B or unidirectional delivery body 115A, or vice versa. As another example, the rows and columns do not necessarily have to be horizontal or vertical. As another example, the term array also includes a sub-array of a larger array. For example, an injection molding apparatus may have 96 cavities laid out in an eight by twelve array (eight columns and twelve rows) which is made up of six sub arrays, each sub array having 16 cavities arranged in four columns by four rows of cavities or other suitable combination of sub arrays. Thus, the breadth and scope of the present disclosure should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

What is claimed is:

1. An edge gating injection molding apparatus for delivering a moldable material to an array of mold cavities, the array having a first column and a second column of mold cavities, the edge gating injection molding apparatus comprising:
   a unidirectional delivery body for delivering a first stream of the moldable material to a mold cavity of the first column; and
   a bidirectional delivery body for delivering a second stream of the moldable material to the mold cavity of the first column and a mold cavity of the second column of mold cavities.

2. The edge gating injection molding apparatus of claim 1, wherein the bidirectional delivery body is positioned between the first and second columns of mold cavities of the array.

3. The edge gating injection molding apparatus of claim 2, wherein the unidirectional delivery body and the bidirectional delivery body are positioned such that pressure from the first stream of moldable material substantially balances pressure from the second stream of moldable material.

4. The edge gating injection molding apparatus of claim 3, wherein the unidirectional delivery body and the bidirectional delivery body are positioned such that the delivery bodies are substantially diametrically opposite each other relative to a center line of the mold cavity of the first column of mold cavities.

5. The edge gating injection molding apparatus of claim 1, wherein the unidirectional delivery body includes two tips, each of the two tips for delivering the first stream of the moldable material to a respective mold cavity of the first column of mold cavities, the two tips pointing in substantially the same direction.

6. The edge gating injection molding apparatus of claim 1, wherein the bidirectional delivery body includes two tips, each of the two tips for delivering the second stream of the moldable material to the mold cavity of the first column of mold cavities and the mold cavity of the second column of mold cavities, the two tips pointing in substantially opposite directions.

7. The edge gating injection molding apparatus of claim 6, wherein the two tips are arranged in a row and the bidirectional delivery body includes more than one row of tips.

8. The edge gating injection molding apparatus of claim 7, wherein the bidirectional delivery body includes a network of channels to direct the moldable material to the tips.

9. The edge gating injection molding apparatus of claim 8, wherein the network of channels include an inlet, a primary channel, and more than one secondary channel in fluid communication with the inlet, via the primary channel, the inlet for receiving a stream of moldable material from a source and the secondary channels for directing a portion of the stream of moldable material from the source to a selected number of the tips.

10. The edge gating injection molding apparatus of claim 9, wherein the network of channels further include more than one tertiary channel in fluid communication with the secondary channels for directing a portion of the portion of the stream of moldable material from the source to a selected number of the selected number of the tips.

11. The edge gating injection molding apparatus of claim 10, wherein the bidirectional delivery body includes two of the networks of channels, the bidirectional delivery body further includes a plug, the plug defining a junction between each primary molding material channel and a pair of opposing secondary molding material channels extending from a downstream end of each primary molding material channel.

12. The edge gating injection molding apparatus of claim 11, wherein the junction includes a first interconnecting channel, a second interconnecting channel, a first segment of primary channel, a second segment of primary channel, a first segment of secondary channel, and a second segment of secondary channel, the first segment of primary channel forming a portion of the primary channel of the one of the networks of channels, the first segment of secondary channel forming a portion of the secondary channel of the other of the networks of channels, the first interconnecting channel interconnecting the first segment of primary channel with the first segment of secondary channel, the second segment of primary channel forming a portion of the primary channel of the other of the networks of channels, the second segment of secondary channel forming a portion of the secondary channel of the other of the networks of channels, the second interconnecting channel interconnecting the second segment of primary channel with the second segment of secondary channel.

13. The edge gating injection molding apparatus of claim 12, wherein the plug includes two halves, each half including a network of troughs such that when the two halves are combined to form the plug, the network of troughs define channels of the junction.

14. The edge gating injection molding apparatus of claim 12, wherein the plug includes a network of troughs such that when the plug is installed in a bore, the network of troughs combines with a corresponding network of troughs of the bore to define channels of the junction.

15. An injection molding apparatus comprising:
   a plurality of cavity inserts arranged in an array having n columns of cavities, each cavity insert having a pair of opposing mold gates;
   a unidirectional delivery body in fluid communication with a molding material source, and positioned outside of a first column of the array;

another unidirectional delivery body in fluid communication with the molding material source, and positioned outside of the last column of the array; and n−1 bidirectional delivery bodies in fluid communication with the molding material source, each of the n−1 bidirectional delivery bodies positioned between adjacent columns of the array, wherein each cavity receives molding material from at least one bidirectional delivery body.

16. The injection molding apparatus of claim 15, wherein each of the n−1 bidirectional delivery bodies is positioned between adjacent columns of mold cavities of the array.

17. The injection molding apparatus of claim 16, wherein the unidirectional delivery body and each of the n−1 bidirectional delivery bodies are positioned such that pressure from the first stream of moldable material substantially balances pressure from the second stream of moldable material.

18. The injection molding apparatus of claim 15, wherein each of the n−1 bidirectional delivery bodies has two molding material inlets, wherein each molding material inlet is in fluid communication with a mold cavity on opposite sides of each of the n−1 bidirectional delivery bodies.

19. The injection molding apparatus of claim 18, wherein the two molding material inlets are positioned along a centerline of each of the n−1 bidirectional delivery bodies.

20. The injection molding apparatus of claim 15, wherein the unidirectional delivery body has two molding material inlets, and only one of the two molding material inlets is in fluid communication between a molding material source and a mold cavity.

* * * * *